(12) United States Patent
Xiong et al.

(10) Patent No.: US 11,917,282 B2
(45) Date of Patent: Feb. 27, 2024

(54) USAGE-BASED ASSESSMENT FOR SURVEILLANCE STORAGE CONFIGURATION

(71) Applicant: Western Digital Technologies, Inc., San Jose, CA (US)

(72) Inventors: Shaomin Xiong, Newark, CA (US); Toshiki Hirano, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/743,622

(22) Filed: May 13, 2022

(65) Prior Publication Data
US 2023/0370710 A1    Nov. 16, 2023

(51) Int. Cl.
*H04N 23/61* (2023.01)
*H04N 7/18* (2006.01)
*H04N 23/63* (2023.01)

(52) U.S. Cl.
CPC .............. *H04N 23/61* (2023.01); *H04N 7/185* (2013.01); *H04N 7/188* (2013.01); *H04N 23/631* (2023.01)

(58) Field of Classification Search
CPC ........ H04N 23/61; H04N 7/185; H04N 7/188; H04N 23/631
See application file for complete search history.

(56) References Cited

U.S. PATENT DOCUMENTS

| 5,831,669 A | * | 11/1998 | Adrain | G06F 18/00 |
| | | | | 348/E7.086 |
| 7,463,775 B1 | * | 12/2008 | Sites | H04N 19/13 |
| | | | | 375/240 |
| 7,609,941 B2 | | 10/2009 | Matsukawa et al. | |
| 2010/0208064 A1 | | 8/2010 | Liu et al. | |

(Continued)

FOREIGN PATENT DOCUMENTS

| KR | 20100071222 A | 6/2010 |
| KR | 20130046606 A | 5/2013 |

(Continued)

OTHER PUBLICATIONS

Seagate Technology LLC, Seagate Surveillance Storage Calculator, 2018, available online at https://www.seagate.com/video-storage/calculator/, retrieved May 12, 2022, 2 pgs.

(Continued)

*Primary Examiner* — Gevell V Selby
(74) *Attorney, Agent, or Firm* — PATENT LAW WORKS LLP

(57) ABSTRACT

Systems and methods for site-based estimation of storage requirements, such as for surveillance video cameras, are described. Product information, a data retention policy, and an intended recording mode about a camera of a surveillance system may be received through a user interface of a user device. A baseline storage value is determined based on the received product information and the data retention policy. A storage requirement may be calculated based on the baseline data storage value and a determined recording (Continued)

co-efficient value based on a sample scene at the camera location. Scene descriptors may be generated based on the sample scene to retrieve the recording co-efficient value from a lookup table.

20 Claims, 10 Drawing Sheets

(56) References Cited

U.S. PATENT DOCUMENTS

2016/0006990 A1\* 1/2016 Williamsson ........ H04N 23/661
                                                            348/143
2019/0230277 A1\* 7/2019 Visa ....................... H04N 23/60

FOREIGN PATENT DOCUMENTS

| KR | 101608992 B1 | 4/2016 |
| KR | 102124027 B1 | 6/2020 |

OTHER PUBLICATIONS

Western Digital Corporation, Surveillance Storage Capacity Estimator Tool, 2022, available online at https://www.westerndigital.com/tools/surveillance-capacity-calculator, retrieved May 12, 2022, 2 pgs.

\* cited by examiner

Surveillance Storage Capacity Estimator Tool

Number of cameras
[ - Select - ]  ⌐ 912

Days to store
[ - Select - ]  ⌐ 914

Hours per day
[ - Select - ]  ⌐ 916

Video format
○ MPEG  ○ H.264  ○ H.265  ○ H.265+
⌐ 918

Resolution
[ - Select - ]  ⌐ 920

Video quality
○ High  ○ Medium  ○ Low
⌐ 922

Scene activity
○ High  ○ Medium  ○ Low

Frames per second (FPS)  ⌐ 924
[ - Select - ]
⌐ 926

Total estimated storage requirements based on usage
[                    ] (TB)*
⌐ 940

Recording mode
○ Continuous  ○ Motion Triggered  ○ Event Triggered
⌐ 928

Storage Plan
○ Local  ○ Cloud  ○ Mixed
⌐ 930

Camera or System
[ Input model here ]
⌐ 932
or
[ Input web link here ]
⌐ 934

[ Scene sample upload ]
⌐ 936

[ Calculate ]
⌐ 938

Example Graphical User Interface Screen 910

Surveillance Storage Capacity Estimator Tool

Number of cameras
| 1 |
⌞ 912

Days to store
| 90 |
⌞ 914

Hours per day
| 24 |
⌞ 916

Video format
○ MPEG  ○ H.264  ● H.265  ○ H.265+
⌞ 918

Resolution
| 1080p |
⌞ 920

Video quality
○ High  ● Medium  ○ Low
⌞ 922

Scene activity
○ High  ○ Medium  ● Low
⌞ 924

Frames per second (FPS)
| 60 FPS |
⌞ 926

Total estimated storage requirements based on usage
| 8.6 |   (TB)*
⌞ 940

Recording mode
○ Continuous   ● Motion Triggered   ○ Event Triggered
⌞ 928

Storage Plan
● Local   ○ Cloud   ○ Mixed
⌞ 930

Camera or System
| WDBELL0042HWT-MTN1 |
⌞ 932 or

| *Input web link here* |
⌞ 934

| Uploaded |
⌞ 936

[ Calculate ]
⌞ 938

Example Graphical User Interface Screen 910

USAGE-BASED ASSESSMENT FOR SURVEILLANCE STORAGE CONFIGURATION

TECHNICAL FIELD

The present disclosure generally relates to video surveillance systems and, more particularly, to assessing storage requirements of video surveillance systems based on usage for system configuration.

BACKGROUND

Network-based video surveillance systems are a growing computing application in both business and personal markets. Some video surveillance systems may include one or more video cameras communicatively connected to a server, such as a network video recorder, through a wired interface, wired or wireless local area network, or wired or wireless wide area network, such as the internet. As video is recorded by the cameras, it is forwarded to the server system where it is stored and/or analyzed for subsequent retrieval. Client or user systems are communicatively connected to the server system to request, receive, and display streams of recorded video data and/or related alerts and analytics.

An increasing number of video surveillance systems are using smart video cameras or otherwise moving compute resources to edge devices in the system, rather than relying solely on a network video recorder appliance or cloud-based processing. For example, some video cameras may be configured with processors, memory, and storage resources far exceeding those needed to convert signals from video image and/or audio sensors into a desired video format for transmission to the network video recorder. However, even these increased compute resources may be limited by space, cost, and other considerations and are unlikely to match the compute resources available in a network video recorder, let alone cloud-based video processing servers.

It may be advantageous to perform real-time storage requirements estimation of a video camera in a network-based surveillance system. However, the factors analyzed for real-time estimation of storage requirements may be oversimplified by taking a one-size fits all approach to video camera capacity and usage.

Systems and methods for improving the accuracy of storage requirements estimation in video cameras may be advantageous. A reliable and efficient way of estimating storage requirements for use in configuring individual cameras installed in a camera location for various recording modes may be needed.

SUMMARY

Various aspects for estimation of storage requirements and related system configuration for video camera surveillance systems are described.

One general aspect includes a system including a processor; a memory; a data storage estimator configured to: receive product information about a video image sensor at a camera location; determine a data retention policy and a recording mode for the video image sensor at the camera location; determine a baseline data storage value based on the received product information and the data retention policy; determine a recording co-efficient value associated with the recording mode for the video image sensor; and calculate a storage requirement based on: the baseline data storage value; and the recording co-efficient value; and a user interface data presenter configured to: present, responsive to a request for an estimated storage requirement, the calculated storage requirement through a user interface of a user device.

Implementations may include one or more of the following features. The system may include a scene description controller configured to: receive scene video data depicting a view at the camera location; determine, based on the scene video data, a scene description comprising at least one scene descriptor; and determine, based on the scene description, a category of scene activity of the view; wherein the data storage estimator is further configured to: retrieve the recording co-efficient value from a lookup table based on the determined category of scene activity of the view; and calculate the storage requirement based on the retrieved recording co-efficient value. The system may include a video camera housing, wherein the video camera housing encloses: the video image sensor; a surveillance controller configured to: receive video data from the video image sensor, wherein the video data includes a video stream of video frames captured by the video image sensor at the camera location; and receive a request for an estimated storage requirement; and a network interface configured to communicate with a network, wherein the surveillance controller is further configured to send, to the scene description controller and over the network, scene video data depicting the view from the user device. The system may also include an object detector, wherein: the object detector includes: a motion model configured to determine a bounding box of moving objects in the video stream; and an image classifier configured to detect an object of interest in the video stream; and the scene description controller is further configured to: compare bounding boxes of moving objects to reference scene data retrieved from a reference data source; determine a metric of activity based on the comparison and the camera location; and determine the category of scene activity responsive to the metric of activity exceeding a predetermined threshold. The system may be configured wherein the scene description controller is further configured to: receive aggregated video data and regional identifiers; generate a co-efficient lookup table of a plurality of co-efficient values based on determined scene activity data from the aggregated video data; determine a representative co-efficient value of the plurality of co-efficient values for each scene descriptor value and corresponding regional identifier; and store the representative co-efficient value for each scene descriptor value and corresponding regional identifier in the co-efficient lookup table. The system may also include the scene description controller that is further configured to: count a number of triggers in the scene video data using a moving object detector; and determine the category of scene activity based on the number of triggers in the scene video data; and the recording co-efficient value in the lookup table is based on the number of triggers. The system may include the scene description controller that is further configured to determine the scene description based on an analysis of the scene video data; the analysis comprises selecting at least one scene descriptor from a set of scene descriptors that includes a plurality of scene descriptors selected from: outdoor; indoor; doorbell; garage; window; balcony; commercial; residential; industrial; and office; and each scene descriptor is associated with a representative recording co-efficient value in the lookup table. The system may include the scene description controller that is further configured to receive the scene video data from at least one of: a camera on the user device; and the video image sensor at the camera location. The system may also include a user interface data selector, wherein: the user interface data selector includes a video format selector configured to receive at least one of: a user selection of video compression format; a user selection of video quality; a user selection of video resolution; and a user selection of a number of frames per second; and the data storage estimator is further configured to: determine an updated baseline data storage value based on at least one of the user selection of video compression format, the user selection of video quality, the user selection of video resolution, and the user selection of the number of frames per second; and determine the storage requirement based the updated baseline data storage value. The system may also include a user interface data selector, wherein: the user interface data selector includes: a data retention policy selector configured to receive at least one of: a number of days to store video data; and a number of hours per day to store video data; and a camera enumeration selector configured to receive a number of cameras; and the data storage estimator is further configured to: determine an updated baseline data storage value based on at least one of the received number of days to store video data, the received number of hours per day to store video data, and the received number of cameras; and determine the storage requirement based the updated baseline data storage value. The system may further include a user interface data selector configured to receive a product information indicator selected from: a web link describing the product information; and a user-inputted model number; wherein the data storage estimator is further configured to: retrieve a set of product information values based on the web link describing the product information, wherein the set of product information values includes at least one of: a video compression format data value; a video quality data value; a video resolution data value; a frames per second data value; a night vision data value; a recording type data value; a supported storage medium data value; a maximum storage data value; and a storage plan data value; determine an updated baseline data storage value based on at least one product information value of the set of product information values; and calculate the storage requirement based on the updated baseline data storage value. The system may be configured such that the data storage estimator is further configured to: determine a plan co-efficient value associated with a data storage plan; and calculate the storage requirement based on the plan co-efficient value. The system may include a data lookup table generator configured to: receive, over a network, aggregated data associated with storage requirements for other systems located in a same region as the video image sensor; determine at least one recording co-efficient value based on the aggregated data; and store the at least one recording co-efficient value in a lookup table.

Another general aspect includes a computer-implemented method including: determining, for a video camera at a camera location: a data retention policy based on a selected time period; and a recording mode; receiving product information about the video camera at the camera location; determining a baseline data storage value based on the received product information and the data retention policy; determining a recording co-efficient value associated with the recording mode for the video camera; calculating a storage requirement based on: the baseline data storage value; and the recording co-efficient value; and presenting, responsive to a request for an estimated storage requirement, the calculated storage requirement on a user interface of a user device.

Implementations may include one or more of the following features. The computer-implemented method may include receiving scene video data depicting a view at the camera location; determining, based on the scene video data, a scene description comprising at least one scene descriptor; determining a category of scene activity of the view based on the scene description; retrieving the recording co-efficient value from a lookup table based on the determined category of scene activity of the view; and calculating the storage requirement based on the retrieved recording co-efficient value. The computer-implemented method may include using an object detection model to determine: verification object data for detected objects in the scene video data; and verification confidence scores for the detected objects; comparing verification object data for the detected objects to reference scene data retrieved from a reference data source; determining a metric of activity based on the comparison and the camera location; and determining the category of scene activity responsive to the metric of activity exceeding a predetermined threshold. The computer-implemented method may include determining an updated baseline data storage value based on at least one of: a received number of days to store video data; a received number of hours per day to store video data; and a received number of cameras; and determining the storage requirement based the updated baseline data storage value. The computer-implemented method may include retrieving a set of product information values based on at least one of: a user-inputted model number; and a received web link; determining an updated baseline data storage value based on at least one product information value from the set of product information values; and calculating the storage requirement based on the updated baseline data storage value. The computer-implemented method may include determining a plan co-efficient value associated with a data storage plan; and calculating the storage requirement based on the plan co-efficient value.

Still another general aspect includes a system including: a processor; a memory; means for determining, for a video camera at a camera location: a data retention policy based on a selected time period; and a recording mode; means for receiving product information about the video camera at the camera location; means for determining a baseline data storage value based on the received product information and the data retention policy; means for determining a recording co-efficient value associated with the recording mode for the video camera; means for calculating a storage requirement based on: the baseline data storage value; and the recording co-efficient value; and means for presenting, responsive to a request for an estimated storage requirement, the calculated storage requirement on a user interface of a user device.

The various embodiments advantageously apply the teachings of computer-based surveillance systems to improve the functionality of such computer systems. The various embodiments include operations to overcome or at least reduce the issues previously encountered in surveillance systems and, accordingly, are more effective and/or cost-efficient than other surveillance systems. That is, the various embodiments disclosed herein include hardware and/or software with functionality to improve estimation of storage requirements of video surveillance systems by determining a baseline data storage value based on received product information and a data retention policy and determining a recording co-efficient value associated with a recording mode for a video camera to increase accuracy of storage requirements estimate for the camera location, scene activity, and use. Accordingly, the embodiments disclosed herein provide various improvements to network-based video surveillance systems.

It should be understood that language used in the present disclosure has been principally selected for readability and instructional purposes, and not to limit the scope of the subject matter disclosed herein.

BRIEF DESCRIPTION OF THE DRAWINGS

FIGS. 9A and 9B are example graphical user interface screens for a method of calculating storage estimation value for a surveillance video camera system.

DETAILED DESCRIPTION

Figure 1:
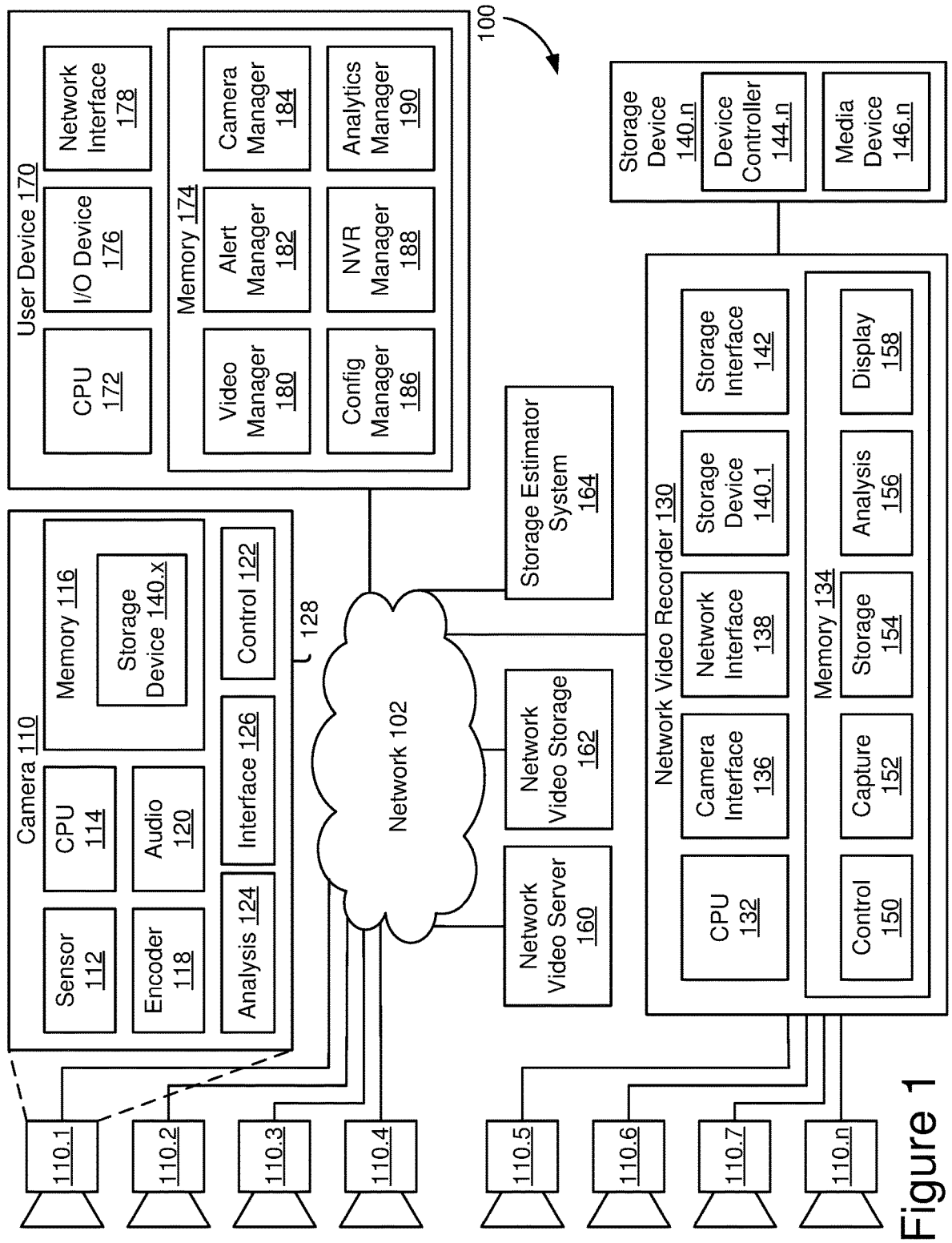
FIG. 1 schematically illustrates a computer-based surveillance system.

FIG. 1 shows an embodiment of an example video surveillance system 100 with multiple video cameras 110 interconnected to a network video recorder 130 for display of surveillance video on user device 170. While some example features are illustrated, various other features have not been illustrated for the sake of brevity and so as not to obscure pertinent aspects of the example embodiments disclosed herein. In some embodiments, cameras 110, network video recorder 130, and user device 170 are computer-based components that may be interconnected by a network 102. Additional components, such as network video server 160 and/or network video storage 162 may also be connected to network 102. In some embodiments, one or more cameras may connect directly to network video recorder 130, such as cameras 110.5-110.n in FIG. 1, without communicating through network 102. Similarly, in alternate embodiments (not shown), user device 170 may connect directly to network video recorder 130.

In some embodiments, one or more networks 102 may be used to communicatively interconnect various components of surveillance system 100. For example, each component, such as cameras 110, network video recorder 130, external storage device 140.n, integrated storage device 140.x, network video server 160, network video storage 162, storage estimator system 164, and/or user device 170 may include one or more network interfaces and corresponding network protocols for communication over network 102. Network 102 may include a wired and/or wireless network (e.g., public and/or private computer networks in any number and/or configuration) which may be coupled in a suitable way for transferring data. For example, network 102 may include any means of a conventional data communication network such as a local area network (LAN), a wide area network (WAN), a telephone network, such as the public switched telephone network (PSTN), an intranet, the internet, or any other suitable communication network or combination of communication networks. In some embodiments, network 102 may comprise a plurality of distinct networks, subnetworks, and/or virtual private networks (VPN) may be used to limit communications among specific components. For example, cameras 110 may be on a limited access network such that video and control data may only be transmitted between cameras 110 and network video recorder 130, enabling network video recorder 130 to control access to cameras 110 and their video data.

Cameras 110 may include analog or digital cameras connected to an encoder that generates an encoded video stream of time-dependent video frames with a defined resolution, aspect ratio, and video encoding format. In some embodiments, cameras 110 may include internet protocol (IP) cameras configured to encode their respective video streams and stream them over network 102 to network video recorder 130. In some embodiments (not shown), the encoder may reside in network video recorder 130. In some embodiments, cameras 110 may be configured to receive audio data through integrated or connected microphones (not shown) and include embedded and/or synchronized audio streams with their respective video streams. In some embodiments, video cameras 110 may include an image sensor 112, a processor (central processing unit (CPU), a neural processing unit, a vision processing unit, etc.) 114, a memory 116 that includes integrated storage device 140.x, an encoder 118, an audio channel 120, a control circuit 122, and/or a network interface 126. In some embodiments, video cameras 110 may include onboard analytics, such as a video analysis subsystem 124.

In some embodiments, the components of camera 110 may be configured in one or more processing systems or subsystems and/or printed circuit boards, chips, busses, etc. that are disposed or enclosed in a video camera housing 128. For example, image sensor 112, processor 114, memory 116, encoder 118, audio channel 120, control circuit 122, analysis subsystem 124, and/or a network interface 126 may comprise one or more application-specific integrated circuits (ASICs) mounted within a sealed plastic, metal, or similar housing with an aperture (often integrating a lens) for receiving light and one or more physical interconnects, such as a network port, for receiving power and communicatively coupling with other system components.

In some embodiments, image sensor 112 may include a solid state device configured to capture light waves and/or other electromagnetic waves and convert the light into an image, generally composed of colored pixels. Image sensor 112 may determine a base image size, resolution, bandwidth, depth of field, dynamic range, and other parameters of the video image frames captured. Image sensor 112 may include charged couple device (CCD), complementary metal oxide semiconductor (CMOS), and/or other image sensor devices of various sensor sizes and aspect ratios. In some embodiments, image sensor 112 may be paired with one or more filters, such as infrared (IR) blocking filters, for modifying the light received by image sensor 112 and/or processed by camera 110. For example, an IR blocking filter may be selectively enabled or disabled for different image capture use cases. In some embodiments, one or more video cameras 110 may include more than one image sensor and related video data paths. For example, video camera 110 may include two image sensors, associated lenses, and data paths to the encoding and processing components in video camera 110. In some embodiments, multiple image sensors are supported by the same circuit board and/or processing subsystem containing processor 114, memory 116, encoder 118, audio channel 120, control circuit 122, analysis subsystem 124, and/or network interface 126.

Digital video data from image sensor 112 may be received by processor 114 for (temporary) storage and processing in memory 116 and/or encoding by encoder 118. Processor 114 may include any type of conventional processor or microprocessor that interprets and executes instructions. In some embodiments, processor 114 may include a neural network processor, such as a neural network processor used by analysis subsystem 124 for supporting object recognition or other onboard analysis. Memory 116 may include a random access memory (RAM) or another type of dynamic storage device that stores information and instructions for execution by processor 114 and/or a read only memory (ROM) or another type of static storage device that stores static information and instructions for use by processor 114 and/or any suitable storage element such as a solid state storage element. Memory 116 may store basic input/output system (BIOS), firmware, and/or operating system instructions for initializing and executing the instructions and processes of cameras 110. Encoder 118 may use various possible digital encoding and/or compression formats for encoding the video data generated by image sensor 112 into a time-dependent video stream composed of video frames at a determined frame rate (number of frames per second). In some embodiments, encoder 118 may use a compressed video format to reduce the storage size and network bandwidth necessary for storing and transferring the original video stream. For example, encoder 118 may be configured to encode the video data as joint photographic expert group (JPEG), motion picture expert group (MPEG)-2, MPEG-4, advanced video coding (AVC)/H.264, and/or other video encoding standards or proprietary formats.

Camera 110 may include audio channel 120 configured to capture audio data to be processed and encoded with image data in the resulting video stream. In some embodiments, one or more microphones may be selectively enabled to capture audio data in parallel with the image data captured by image sensor 112. For example, microphone may be configured with an audio sensor that captures sound waves and converts them into a time-based audio data stream. In some embodiments, encoder 118 may include an audio encoder that operates in conjunction with the video encoder to encode a synchronized audio data stream in the video stream. For example, the video format used to by encoder 118 may include one or more audio tracks for encoding audio data to accompany the image data during video stream playback.

Control circuit 122 may include a control circuit for managing the physical position of a camera 110. In some embodiments, camera 110 may be a pan-tilt-zoom (PTZ) camera that is capable of remote directional and zoom control. Control circuit 122 may be configured to receive motion commands through network interface 126 and/or through another interface, such as a dedicated remote-control interface, such short distance infrared signals, Bluetooth, etc. For example, network video recorder 130 and/or user device 170 may be configured to send PTZ commands to control circuit 122, which translates those commands into motor position control signals for a plurality of actuators that control the position of camera 110. In some embodiments, control circuit 122 may include logic for automatically responding to movement or other triggers detected through image sensor 112 to redirect camera 110 toward the source of movement or other trigger. For example, an auto tracking feature may be embodied in firmware that enables the camera to estimate the size and position of an object based on changes in the pixels in the raw video stream from image sensor 112 and adjust the position of the camera to follow the moving object, returning to a default position when movement is no longer detected. Similarly, an auto capture feature may be embodied in firmware that enables the camera to determine and bound an object based on an object detection algorithm and center and zoom on that object to improve image size and quality. In some embodiments, control circuit 122 may include logic for virtual PTZ or ePTZ, which enables a high-resolution camera to digitally zoom and pan to portions of the image collected by image sensor 112, with no physical movement of the camera. In some embodiments, control circuit 122 may include software and one or more application protocol interfaces (APIs) for enabling remote devices to control additional features and capabilities of camera 110. For example, control circuit 122 may enable network video recorder 130, another video camera 110, and/or user device 170 to configure video formats, enable and disable filters, set motion detection, auto tracking, and similar features, and/or initiate video data streaming. In some embodiments, one or more systems may provide PTZ position control signals (and/or PTZ positioning commands converted to PTZ position control signals by control circuit 122) through the API.

In some embodiments, video camera 110 may include video analysis subsystem 124 configured for onboard video analytics. For example, video analysis subsystem 124 may be configured to use processor 114 and memory 116 to execute at least a portion of video analytics for video data captured by video camera 110. In some embodiments, video analysis subsystem 124 may be configured to operate similarly to video analysis subsystem 156 in network video recorder 130, as further described below, and embody one or more analytics engines and/or analytical model libraries. In some embodiments, video analysis subsystem 124 may be configured to support real-time object detection within camera 110 without processing support from network video recorder 130 or network video server 160. For example, video analysis subsystem 124 may receive a video stream (from sensor 112 and/or encoder 118), initiate an object detector to determine whether an object of interest is present in the video data and, if so, return the object's position within the video frame, and post-process the data from the object detector to determine whether an object detection event should be raised to other components in the system.

Network interface 126 may include one or more wired or wireless connections to network 102 and/or a dedicated camera interface of network video recorder 130. For example, network interface 126 may include an ethernet jack and corresponding protocols for IP communication with network video recorder 130. In some embodiments, network interface 126 may include a power over ethernet (PoE) connection with network video recorder 130 or another camera access point. PoE may enable both power for camera 110 and network data to travel on the same wire. In some embodiments, network interface 126 may enable an IP camera to be configured as a network resource with an IP address that is accessible on a LAN, WAN, or the internet. For example, network video recorder 130 and/or user device 170 may be configured to selectively receive video from cameras 110 from any internet-connected location using internet addressing and security protocols.

Network video recorder 130 may include a computer system configured as a video storage device to record the video streams from cameras 110. For example, network video recorder 130 may be configured to receive video streams from each of cameras 110 for storage, analysis, and/or display through user device 170. In some embodiments, cameras 110 may send encoded video streams based on the raw image data collected from their respective image sensors 112, with or without video data compression. A single video stream may be received from each camera 110 and network video recorder 130 may be configured to receive video streams from all connected cameras in parallel, as network bandwidth and processing resources allow.

Network video recorder 130 may include a housing and a bus interconnecting at least one processor 132, at least one memory 134, at least one storage device 140, and at least one interface, such as camera interface 136, network interface 138, and/or storage interface 142. The housing (not shown) may include an enclosure for mounting the various subcomponents of network video recorder 130, locating any physical connectors for the interfaces, and protecting the subcomponents. Some housings may be configured for mounting within a rack system. The bus (not shown) may include one or more conductors that permit communication among the components of network video recorder 130. Processor 132 may include any type of processor or microprocessor that interprets and executes instructions or operations. Memory 134 may include a random access memory (RAM) or another type of dynamic storage device that stores information and instructions for execution by processor 132 and/or a read only memory (ROM) or another type of static storage device that stores static information and instructions for use by processor 132 and/or any suitable storage element.

In some embodiments, network video recorder 130 may include camera interface 136 configured for connection with one or more cameras 110. For example, camera interface 136 may include a plurality of ethernet ports and supporting protocols compatible with PoE standards for connecting to cameras 110.5-110.$n$. In some embodiments, camera interface 136 may include a PoE network switch for providing power to connected cameras and routing data packets to and from cameras 110.5-110.$n$, such as control and video data. In some embodiments, network video recorder 130 may not include a dedicated camera interface 136 and may use network interface 138 for communication with cameras 110 over network 102.

Network interface 138 may include one or more wired or wireless network connections to network 102. Network interface 138 may include a physical interface, such as an ethernet port, and related hardware and software protocols for communication over network 102, such as a network interface card.

Storage devices 140 may include one or more non-volatile memory devices configured to store video data, such as a hard disk drive (HDD), solid state drive (SSD), flash memory-based removable storage (e.g., secure data (SD) card), embedded memory chips, etc. In some embodiments, storage device 140 is, or includes, a plurality of solid-state drives. In some embodiments, network video recorder 130 may include internal storage device 140.1 and expandable storage that enables additional storage devices 140.$n$ to be connected via storage interface 142. In an embodiment, an integrated storage device 140.$x$ may be inserted into a camera 110 connected via memory 116. Each storage device 140 may include a non-volatile memory (NVM) or device controller 144 based on compute resources (processor and memory) and a plurality of NVM or media devices 146 for data storage (e.g., one or more NVM device(s), such as one or more flash memory devices). In some embodiments, a respective data storage device 140 of the one or more data storage devices includes one or more NVM controllers, such as flash controllers or channel controllers (e.g., for storage devices having NVM devices in multiple memory channels). In some embodiments, storage devices 140 may each be packaged in a housing, such as a multi-part sealed housing with a defined form factor and ports and/or connectors for interconnecting with storage interface 142. Storage device 140.1, integrated storage device 140.$x$ and each expanded storage devices 140.$n$ may be of the same storage device type or a different storage device type.

In some embodiments, a respective data storage device 140 may include a single medium device, while in other embodiments the respective data storage device 140 includes a plurality of media devices. In some embodiments, media devices include NAND-type flash memory or NOR-type flash memory. In some embodiments, storage device 140 may include one or more hard disk drives. In some embodiments, storage devices 140 may include a flash memory device, which in turn includes one or more flash memory die, one or more flash memory packages, one or more flash memory channels or the like. However, in some embodiments, one or more of the data storage devices 140 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 140 includes a device controller 144, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices 146 are coupled to device controllers 144 through connections that typically convey commands in addition to data, and optionally convey metadata, error correction information and/or other information in addition to data values to be stored in media devices and data values read from media devices 146. Media devices 146 may include any number (i.e., one or more) of memory devices including, without limitation, non-volatile semiconductor memory devices, such as flash memory device(s). In some embodiments, media devices 146 may include NAND or NOR flash memory devices comprised of single level cells (SLC), multiple level cell (MLC), triple-level cells, or more.

In some embodiments, media devices 146 in storage devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 140 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 140, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, video media files, or other logical data constructs composed of multiple host blocks. In some embodiments, storage device 140 may be configured specifically for managing the storage and overwriting of video data in a continual monitoring application for video surveillance.

Storage interface 142 may include a physical interface for connecting to one or more external storage devices using an interface protocol that supports storage device access. For example, storage interface 142 may include a peripheral component interconnect express (PCIe), serial advanced technology attachment (SATA), small computer system interface (SCSI), serial attached SCSI (SAS), universal serial bus (USB), Firewire, or similar storage interface connector supporting storage protocol access to storage devices 140.*n*. In some embodiments, storage interface 142 may include a wireless data connection with sufficient bandwidth for video data transfer. Depending on the configuration and protocols used by storage interface 142, storage device 140.*n* may include a corresponding interface adapter, firmware, and/or protocols for receiving, managing, and responding to storage commands from network video recorder 130.

Network video recorder 130 may include a plurality of modules or subsystems that are stored and/or instantiated in memory 134 for execution by processor 132 as instructions or operations. For example, memory 134 may include a camera control subsystem 150 configured to control cameras 110. Memory 134 may include a video capture subsystem 152 configured to receive video streams from cameras 110. Memory 134 may include a video storage subsystem 154 configured to store received video data in storage device(s) 140 and/or network video storage 162. Memory 134 may include a video analysis subsystem configured to analyze video streams and/or video data for defined events, such as motion, recognized objects, recognized faces, and combinations thereof. Memory 134 may include a video display subsystem configured to selectively display video streams on user device 170, which may be attached to network video recorder 130 or remotely connected via network 102. In some embodiments, the functions of storage estimator system 164 may be integrated in network video recorder 130 and instantiated in memory 134 as a storage estimator subsystem and/or a subset of functions of analysis subsystem 156.

In some embodiments, camera control subsystem 150 may include interface protocols and a set of functions and parameters for using, configuring, communicating with, and providing command messages to cameras 110. For example, camera control subsystem 150 may include an API and command set for interacting with control circuit 122 to access one or more camera functions. In some embodiments, camera control subsystem 150 may be configured to set video configuration parameters for image sensor 112 and/or video encoder 118, access pan-tilt-zoom features of control circuit 122, set or modify camera-based motion detection, tripwire, and/or low light detection parameters in memory 116, and/or otherwise manage operation of cameras 110. For example, camera control subsystem 150 may maintain a video camera configuration table, pages, or similar data structures that includes entries for each video camera being managed and their respective camera-specific configuration parameters, active control features (such as PTZ control), and other configuration and control information for managing cameras 110. In some embodiments, each camera 110 may be assigned a unique camera identifier that may be used by camera control subsystem 150, video capture subsystem 152, and/or other subsystems to associate video data with the camera from which it was received.

In some embodiments, video capture subsystem 152 may include interface protocols and a set of functions and parameters for receiving video streams from cameras 110. For example, video capture subsystem 152 may include video data channels and related data buffers for managing a plurality of camera video data streams. In some embodiments, each video camera 110 may be allocated a dedicated video channel for continuously and/or selectively sending its video stream to network video recorder 130. Video capture subsystem 152 may be configured to pass each received video stream to video storage subsystem 154, video analysis subsystem 156, and/or video display subsystem 158.

In some embodiments, video storage subsystem 154 may include interface protocols and a set of functions and parameters for managing storage of video data in storage devices 140 and/or network video storage 162 for later retrieval and use by video analysis subsystem 156 and/or video display subsystem 158. For example, video storage subsystem 154 may write camera video stream data from video data buffers to non-volatile storage in storage devices 140 and video analysis subsystem 156 and/or video display subsystem 158 may be configured to selectively read video data from storage devices 140. In some embodiments, video storage subsystem 154 may include management of video storage space in storage devices 140 and/or network video storage 162 in accordance with one or more data retention and/or data archiving schemes. For example, surveillance system 100 may support continuous and/or triggered recording of video data from cameras 110 and video storage subsystem 154 may include logic for enforcing a data retention and overwriting policy whereby the fixed storage space of storage devices 140 is recycled for storing a recent period of captured video, video data meeting specific retention criteria, and/or deleting or archiving video data after one or more periods of time defined in the data retention policy. In some embodiments, video storage subsystem 154 may include or access video decoders and/or encoders for storing video data in a storage video format that is different than the camera video format, such as using a different codec, compression factor, frame rate, resolution, image size, etc.

In some embodiments, video analysis subsystem 156 may include interface protocols and a set of functions and parameters for analyzing video data from cameras 110. For example, video analysis subsystem 156 may be configured to run one or more event detection algorithms for determining, tagging, and/or initiating alerts or other actions in response to detected video events. In some embodiments, video analysis subsystem 156 may be configured to tag or build metadata structures that map detected events to time and image location markers for the video stream from which they are detected. For example, video analysis subsystem 156 may use motion, tripwire, object recognition, facial recognition, audio detection, speech recognition, and/or other algorithms to determine events occurring in a video stream and tag them in a corresponding metadata track and/or separate metadata table associated with the video data object. In some embodiments, video analysis subsystem 156 may include event handling logic for determining response to detection of one or more detected events or objects, such as raising an alert to user device 170 or triggering selective display of a video stream including the detected event through video display subsystem 158. In some embodiments, video analysis subsystem 156 may operate in real-time or near real-time on video data received by video capture subsystem 152, delayed processing of video data stored by video storage subsystem 154, and/or a combination thereof based on the nature (and processing requirements) of the video events, volume of video to be processed, and other factors. In some embodiments, video analysis subsystem 156 may comprise one or more analytics engines configured for a particular type of event and corresponding event detection algorithm or model.

In some embodiments, video display subsystem 158 may include interface protocols and a set of functions and parameters for displaying video from video capture subsystem 152 and/or video storage subsystem 154 on user device 170. For example, video display subsystem 158 may include a monitoring or display configuration for displaying one or more video streams in real-time or near real-time on a graphical user display of user device 170 and/or receive video navigation commands from user device 170 to selectively display stored video data from video storage subsystem 154. In some embodiments, video display subsystem 158 may maintain an index of real-time/near real-time video streams and/or stored or archived video streams that are available for access by user device 170. In some embodiments, the video index may include a corresponding metadata index that includes video data parameters (e.g., time, location, camera identifier, format, low light/normal light, etc.), detected video event metadata (event time, location, type, parameters, etc.), and/or video management parameters (expiration, active/archive, access control, etc.) for use in displaying and managing video data. Video display subsystem 158 may be configured to support user device 170 when directly attached to network video recorder 130 and/or via network 102 within a LAN, WAN, VPN, or the internet.

In some embodiments, surveillance system 100 may include one or more remote and/or cloud-based resources for supporting the functions of network video recorder 130 and/or user device 170. For example, surveillance system 100 may include a network video server 160 configured to host some, all, or select portions of the functions of network video recorder 130, such as a cloud-based server system or video surveillance as a service (VSaaS) server. As another example, surveillance system 100 may include network video storage 162 for storing active and/or archived video data, supplementing and/or replacing storage devices 140, such as a cloud-based network attached storage system or distributed storage system. In some embodiments, the majority of functions described above for network video recorder 130 may reside in network video recorder 130 and select functions may be configured to leverage additional resources in network video server 160 and/or network video storage 162. For example, network video server 160 may be configured to support specialized and/or processing intensive event detection algorithms to supplement video analysis subsystem 156 and/or network video storage 162 may be configured to support archiving of inactive video data for longer term storage.

In some embodiments, surveillance system 100 may include one or more storage estimator systems 164 for enabling estimation of storage requirements for one or more cameras 110 and associated integrated storage devices 140.*x* based on locations of cameras 110 and scene activity in the locations as well as recording modes of the camera 110. In some embodiments, storage estimator system 164 may be temporarily connected to surveillance system 100 during a configuration stage and disconnected during normal operation of surveillance system 100. For example, a separate computing device hosting a data storage estimator may be connected to surveillance system 100 through network 102, network video recorder 130, and/or cameras 110. In some embodiments, storage estimator system 164 may be instantiated in network video recorder 130, network video server 160, and/or user device 170 to provide data storage estimation during a configuration stage or on request. In some embodiments, storage estimator system 164 may include a processor, memory, input/output (I/O) devices, network interface, and/or other compute resources instantiating and/or supporting a data storage estimator and/or functions described therein, as further described below. In some embodiments, storage estimator system 164 may incorporate compute resources, such as specialized processors and memory configurations, for supporting heavy weight object detection, motion, tracking, and/or classification models that could not practically be implemented by other system components, particularly cameras 110.

User device 170 may be any suitable computer device, such as a computer, a computer server, a laptop computer, a tablet device, a netbook, an internet kiosk, a personal digital assistant, a mobile phone, a smart phone, a gaming device, or any other computing device. User device 170 is sometimes called a host, client, or client system. In some embodiments, user device 170 may host or instantiate one or more applications for interfacing with surveillance system 100. For example, user device 170 may be a personal computer or mobile device running a surveillance monitoring and management application configured to provide a user interface for network video recorder 130. In some embodiments, user device 170 may be configured to access cameras 110 and/or their respective video streams through network video recorder 130 and/or directly through network 102. In some embodiments, one or more functions of network video recorder 130 may be instantiated in user device 170 and/or one or more functions of user device 170 may be instantiated in network video recorder 130.

User device 170 may include one or more processors 172 for executing compute operations or instructions stored in memory 174 for accessing video data and other functions of network video recorder 130 through network 102. In some embodiments, processor 172 may be associated with memory 174 and input/output device 176 for executing both video display operations and surveillance system management operations. Processor 172 may include any type of processor or microprocessor that interprets and executes instructions or operations. Memory 174 may include a random access memory (RAM) or another type of dynamic storage device that stores information and instructions for execution by processor 172 and/or a read only memory (ROM) or another type of static storage device that stores static information and instructions for use by processor 172 and/or any suitable storage element. In some embodiments, user device 170 may allocate a portion of memory 174 and/or another local storage device (in or attached to user device 170) for storing selected video data for user device 170. In some embodiments, user device 170 may include one or more input/output (I/O) devices 176. For example, a graphical display, such as a monitor and/or touch screen display, and/or other user interface components such as a keyboard, a mouse, function buttons, speakers, vibration motor, a track-pad, a pen, voice recognition, biometric mechanisms, and/or any number of supplemental devices to add functionality to user device 170. Network interface 178 may include one or more wired or wireless network connections to network 102. Network interface 178 may include a physical interface, such as an ethernet port, and/or related hardware and software protocols for communication over network 102, such as a network interface card, wireless network adapter, and/or cellular data interface.

User device 170 may include a plurality of modules or subsystems that are stored and/or instantiated in memory 174 for execution by processor 172 as instructions or operations. For example, memory 174 may include a video manager 180 configured to provide a user interface for selectively navigating and displaying real-time, near real-time, and/or stored video streams. Memory 174 may include alert manager 182 configured to provide a user interface for setting, monitoring, and displaying alerts based on video events. Memory 174 may include a camera manager 184 configured to provide a user interface for identifying, configuring, and managing cameras 110. Memory 174 may include a configuration manager 186 to provide a user interface for setting and managing system settings, user access controls, storage options, and other configuration settings for surveillance system 100. Memory 174 may include a network video recorder manager 188 configured to provide a user interface for identifying, configuring, and managing network video recorder 130 and/or multiple network video recorders. Memory 174 may include an analytics manager configured to provide a user interface for selecting, training, and managing event detection algorithms for surveillance system 100.

In some embodiments, video manager 180 may include interface protocols and a set of functions and parameters for navigating and displaying video streams from cameras 110. For example, video manager 180 may include a graphical user interface and interactive controls for displaying lists, tables, thumbnails, or similar interface elements for selecting and displaying video streams for particular cameras, times, locations, and/or events. In some embodiments, video manager 180 may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, video manager 180 may include a data structure summarizing all video data stored in surveillance system 100 to enable the user to locate and view older surveillance video. For example, a video management log or datastore may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.). In some embodiments, video manager 180 may be configured to interface with video display subsystem 158 and/or storage subsystem 154 for determining and retrieving selected video data.

In some embodiments, alert manager 182 may include interface protocols and a set of functions and parameters for setting, monitoring, and displaying alerts based on video events. For example, the user may define a set of trigger events that generate visual, audible, tactile, and/or notification-based (electronic mail, text message, automated call, etc.) alert to user device 170. In some embodiments, alert manager 182 may include a plurality of preset alert conditions with associated event parameters and enable a user to enable and disable alert types and/or change associated event parameters. In some embodiments, alert manager 182 may be configured to overlay graphical elements representing detected events or event indicators on video streams displayed through video manager 180. For example, detected motion, objects, or faces may be boxed or highlighted, tagged with relevant identifiers, or otherwise indicated in the video playback on user device 170. In some embodiments, alert manager 182 may be configured to interface with video analysis subsystem 156, video capture subsystem 152, and/or directly with cameras 110 for receiving event notifications or parameters.

In some embodiments, camera manager 184 may include interface protocols and a set of functions and parameters for identifying, configuring, and managing cameras 110. Configuration manager 186 may include interface protocols and a set of functions and parameters for setting and managing system settings, user access controls, storage options, and other configuration settings. Network video recorder (NVR) manager 188 may include interface protocols and a set of functions and parameters for identifying, configuring, and managing network video recorder 130. For example, each of camera manager 184, configuration manager 186, and/or NVR manager 188 may include a series of graphical user interfaces for displaying their respective component identifiers and related configuration parameters and enabling the user to view and/or change those parameters for managing surveillance system 100 and its component systems. In some embodiments, camera manager 184, configuration manager 186, and/or NVR manager 188 may provide changes parameters to the effected components, such as camera manager 184 sending camera configuration parameter changes to selected cameras 110, NVR manager 188 sending NVR configuration parameter changes to network video recorder 130, and/or configuration manager 186 sending system configuration parameter changes to all effected components.

In some embodiments, analytics manager 190 may include interface protocols and a set of functions and parameters for selecting, training, and managing event detection algorithms. For example, analytics manager 190 may include a library of event detection algorithms for different event types. In some embodiments, the event detection algorithms may include a set of parameters and/or model weights that are preconfigured based on training data sets processed independent of surveillance system 100. For example, analytics manager 190 may include object detection algorithms for common objects, situations, and camera configurations. In some embodiments, analytics manager 190 may include preconfigured training data sets and/or enable the user to define training data sets for determining or refining event detection algorithm parameters and/or model weights based on predefined base algorithms or models. In some embodiments, analytics manager 190 may interface with analysis subsystem 156 for using the event detection algorithms configured through analytics manager 190 to process video data received by network video recorder 130 and/or selecting, training, and managing those algorithms.

Figure 2:
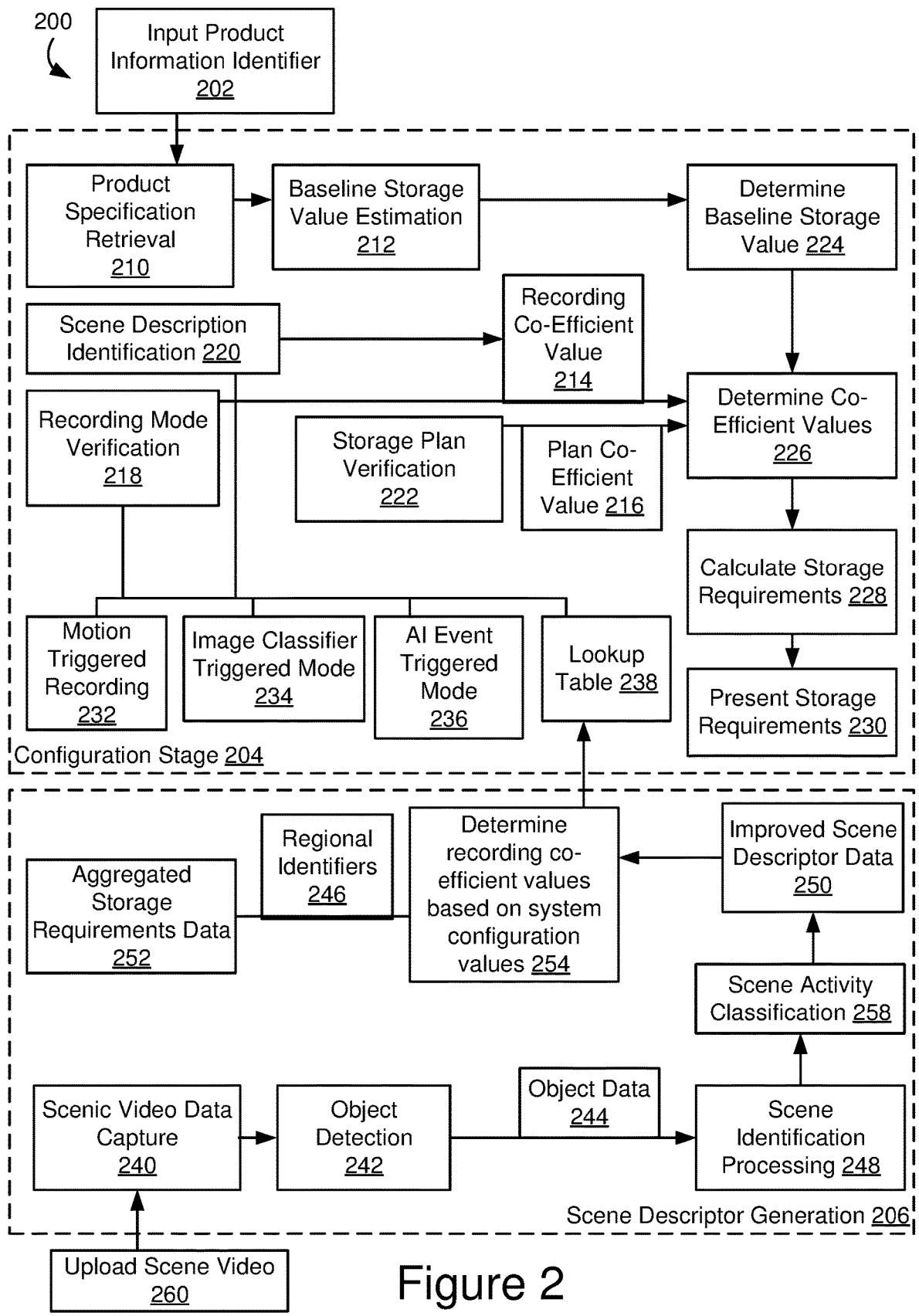
FIG. 2 schematically illustrates a configuration stage and scene descriptor generation that may be used by the computer-based surveillance system of FIG. 1.

FIG. 2 shows a schematic representation of configuration and scene descriptor generation during normal operation that may be implemented in a computer-based surveillance system 200, such as surveillance system 100 in FIG. 1. At block 202, a product information identifier, or indicator, is inputted. For example, during the installation of surveillance system 200, each video camera may be physically mounted with a field of view that the user intends to monitor. In some embodiments, each video camera may be installed with a fixed position and field of view. Each video camera may include a product information identifier, or product information indicator, such as a camera manufacturer's model number or web link to a website having complete product information.

In some embodiments, a configuration stage 204 may be initiated during or after the product information identifier has been inputted. For example, a storage estimator system may be connected to surveillance system 200 and/or instantiated in one of the components thereof. In some embodiments, the timing and length of configuration stage 204 may be determined by a period of data capture deemed sufficient for generating co-efficient values for the calculation of storage requirements for one or more storage devices, located in the camera itself or an associated network video recorder.

In some embodiments, configuration stage 204 may be completed only once for each video camera, such as during or immediately following installation. In some embodiments, configuration stage 204 may occur periodically over the operating life of surveillance system 200 and/or be re-executed in response to events, changes, or updates that may change the scene activity (e.g., moving the camera, more activity occurring, etc.) or require a new scene video to be uploaded 260 for scene descriptor generation 206.

During configuration stage 204, product specification details may be retrieved at block 210. For example, the product information identifier inputted, such as a model number or web link to the product information, may be used to retrieved product specification details, such as video recording format details including video compression format, video quality, video resolution, number of frames per second, night vision capability, supported storage media, and maximum storage capacity. Night vision capability may include various night vision data values, such as 1 or 3 channels, in an embodiment. At block 212, a baseline storage value estimation process may be executed by a data storage estimator based on the retrieved product specification details to determine a baseline storage value 224. A baseline storage value may be calculated using the product specification details and, in one embodiment, a default recording mode, default data retention policy, and a default data storage plan.

Independent of the baseline storage value estimation at block 212, recording mode verification may be executed by a storage estimator system at block 218. For example, the recording mode, or recording type data value, such as continuous recording, motion-detected recording, or AI-event occurrence recording, as well as the data retention policy, such as number of days data retained (e.g., 30, 60, or 90 days) and number of hours in a day being recorded, may be selected by a user through a user interface on a user device connected to the storage estimator system connected to surveillance system 200 or instantiated in a network video recorder or VSaaS server. The user interface may include a data retention policy selector, for example, that generates a drop down menu, text field, or other user interface element.

Similarly, independent of the baseline storage value estimation at block 212, storage plan verification may be executed by a storage estimator system at block 220. For example, a data storage plan, such as local storage at the camera, cloud storage on a network video recorder, or a mix of a network video recorder (NVR), digital video recorder (DVR), or cloud, may be selected via a user interface at a user device connected to the storage estimator system connected to surveillance system 200 or instantiated in a network video recorder or VSaaS server.

In some embodiments, configuration stage 204 may be executed separately from scene descriptor generation 206, during which scene video is uploaded 260 and captured 240 to generate improved scene descriptor data 250 for determining recording co-efficient values for a lookup table 238 in the configuration stage 204. For example, scene descriptor generation 206 may depict a period of scenic video data capture 240 during which some level of scenic activity is happening. For example, the scene may be indoors, outdoors, pointed towards a driveway, a busy street, etc. The uploaded scene video 260 can be video captured from a user device, such as a mobile phone with a camera, in an embodiment. The video data can be analyzed to observe object detection 242. An object data 244 may be observed and identified during the object detection 242. During scene identification processing 248, the object data 244 may be identified, such as a car entering a driveway or a person approaching a doorway. These types of scenarios may be recognizable by the scene identification processing 248. Scene activity classification 258 may also be performed, using information from scene identification processing 248, such that improved scene descriptor data 250 may be generated. A category of scene activity, such as high, medium, and low, may be determined by a user, in an embodiment, through a user interface during a system configuration and/or estimation of storage requirements based on usage. In another embodiment, a category of scene activity may be determined programmatically based on a number of triggers detected in a scene video data. Where the number of triggers exceeds a predetermined threshold for a category of scene activity, such as high, the scene activity is determined to be high. Scene activity classification 258 includes these different ways of determining scene activity categories. Additionally, aggregated storage requirements data 252 may be accessible that include regional identifiers 246. For example, region-specific data, such as the scene activity level of a busy street in China, with many people and objects passing by a front door, may be associated with a specific storage requirement, in contrast with a different region, such as a quiet suburban neighborhood in the United States, with fewer people and objects passing by a front door. Through the scene descriptor generation 206, a set of recording co-efficient values may be generated based on the system configuration values 254 as well as analysis of scene activity through improved scene descriptor data 250 and aggregated storage requirements of other surveillance systems around the world. These recording co-efficient values may be stored in a lookup table 238, accessible in the configuration stage 204.

Independent of the baseline storage value estimation at block 212, scene description identification may be executed by a storage estimator system at block 220. Scene description identification may rely on a motion model 232, an image classifier 234, an AI Event model 236, and a lookup table 238.

Object detection may be executed at block 242 for scenic video data by a scene descriptor generator during scene description identification 220 using the motion model 232, image classifier 234, and/or AI Event model 236, in an embodiment. Object detection may include computational image processing that detects objects of desired types or classes within an image and provides position information, such as bounding boxes, and detected object classes for those objects. Object detection algorithms may include one-stage and two-stage methods, where one-stage methods, such as you-only-look-once (YOLO) models, single shot detector multibox (SSD Multibox), RetinaNet, etc. use a single pass through a deep neural network and two-stage methods, such as various region-based convolutional neural networks (R-CNN) models (Faster R-CNN, Mask R-CNN, Cascade R-CNN, etc.), use a selective search for regions of interest followed by processing each region (bounding box for the region of interest) through a neural network. Object detection may generate position information for one or more detected objects in the video frame. For example, for each object detected, the object detector may output location data, such as at least two corner coordinates, for bounding boxes that provide both a frame for the detected object image data and locate it within the larger video frame.

In some embodiments, recording mode verification 218 and/or scene description identification 220 may include motion triggered recording 232. For example, motion triggered recording may be configured to count the number of pixels which change from one frame to another. If the number of changed pixels exceeds a change threshold, the motion triggered recording may trigger a positive result. Motion triggered recording may include the most sensitive recording compared to classifier and AI event triggered. For the same scene, if a camera is motion triggered recording, it requires more storage than classifier triggered and AI event triggered recording. However, motion triggered recording requires less storage than continuous recording mode. The motion triggered recording mode may use a motion model that may return a bounding box for the object in motion. Note that the use of a motion model may be most appropriate where the object of interest is typically a moving object, such as cars or people passing through an entrance or exit. A motion model may be paired with a high precision classifier for the object of interest to finding missed detections and/or determine object class.

In some embodiments, recording mode verification 218 and/or scene description identification 220 may include an image classifier triggered mode 234, such as a high-precision image classifier. Image classifier triggered mode 234 may process a frame in scene video data as a whole to determine the presence or absence of an object of interest (a binary result) and may generally perform with higher reliability than object detectors. For example, a high precision image classifier may have an accuracy of 99% or higher with a very low false alarm rate. In some embodiments, image classifier triggered mode 234 may operate alone or in conjunction with the other algorithms for determining triggers for recording and object class information.

In some embodiments, recording mode verification 218 and/or scene description identification 220 may include an AI event triggered mode 236. For example, an AI event triggered mode may use machine learning techniques to learn that a certain event is happening, such as a person approaching a doorway or a car entering a driveway, based on position and object class information for continuous frames in the uploaded scenic video data. The AI event triggered mode 236 may operate in conjunction with and be initiated by an object detector. In some embodiments, AI event triggered mode 236 may be trained on video data from other similar scenes, based on where the camera is mounted. Thus, the AI event triggered mode 236 may recognize a specific event happening and trigger a recording mode based on the recognized event occurring. AI event triggered mode 236 may be paired with image classifier triggered mode 234 for verifying classified images, such as moving objects including cars, humans, pets, and animals, as well as stationary objects such as driveways, furniture, grass, and so forth.

Recording mode verification 218 checks whether the camera is in motion triggered recording mode, image classifier triggered recording mode, AI event triggered recording, or continuous recording mode, in an embodiment. Continuous recording requires the most storage, followed by motion triggered recording, then image classifier triggered mode, then AI event triggered mode. The final recording co-efficient value 214 depends on the recording mode verification 218 and the scene description identification 220 (206). Firstly, a scene description is gathered. Then, the recording mode is verified. Then, from the description and recording mode, a lookup table or empirical equation is used to obtain the final recording co-efficient. In an embodiment, a separate lookup table or empirical equation may be used for each type of recording mode.

For example, the scene description identification 220 may identify the camera being located in the United States and pointing toward a driveway in a quiet suburban neighborhood surrounded by other homes. Specifically, scene descriptors such as "outdoor," "driveway," and a region-specific indicator of United States may be included in the scene description. In an embodiment, if the user does not upload video data, text data may be inputted that describes the scene. Based on these scene descriptors, as well as information on the intended recording mode (results from 218) of the surveillance system 200, a recording co-efficient value 214 may be determined based on the lookup table 238, such as 0.9 for a busy scene, as an example. However, if the scene activity is not busy, then the co-efficient may be 0.1 based on the scene activity classification 258 that results in scene description identification 220. If the camera is AI event triggered, for the same busy scene (0.9), the co-efficient may be 0.45 because most of the motions will not trigger alarms and will not be recorded. For the same quiet scene, the co-efficient could be 0.05 if the camera is AI event triggered. As another example, continuous recording mode would result in a recording co-efficient of 1. However, a motion-triggered recording mode or an event triggered recording mode would have different co-efficient values, Cm and Ce, respectively. These values may be generated by a separate process, as described above with respect to the scene descriptor generation 206, either in a simple lookup table or empirical equation based on recording mode.

Similarly, based on the storage plan verification 222, a plan co-efficient value 216 may be determined. For example, a cloud storage plan would result in a plan co-efficient value 216 of 0 because the storage device would be on the network video recorder and not on the camera. Similarly, a local storage plan would result in a plan co-efficient value 216 of 1 because the storage device on the camera would be the only storage available. However, a mixed storage plan, such as first half retention on cloud, second half retention on edge, as an example, may result in a plan co-efficient value 216 of Cp, where Cp is determined by the storage plan of the cloud.

At block 226, co-efficient values, including recording co-efficient value 214 and plan co-efficient value 216, are determined. For example, based on scene description identification 220, a recording co-efficient value 214 may be determined by retrieving a value based on the recording mode type and the scene activity identified in the scene descriptors as well as the region-specific identifier. In some embodiments, recording co-efficient values differ by regions. Next, storage requirements are calculated at block 228 using the baseline storage value and determined co-efficient values. The calculation is the product of the baseline storage value based on product specification details, recording co-efficient value retrieved from a lookup table, and a plan co-efficient value. For example, a baseline storage value may be fourteen terabytes (14 TB), a recording co-efficient value for a motion triggered suburban outdoor driveway in the US (Cm) may be 0.6 based on empirical data in the lookup table, and a storage plan co-efficient value may be 1 because the plan is to have local storage on the camera. Thus, the calculated storage requirement would be 14 TB*0.6*1, or 8.4 TB. At block 230, the storage requirements may be presented to the user interface for viewing. In an embodiment, storage devices in the cameras may be configured responsive to the calculated storage requirement. For example, storage devices may be added or changed in the cameras based on the calculated storage requirements. A storage device in a camera previously configured for 5 TB may be configured to add additional storage devices or change the storage device to meet the calculated storage requirements based on usage, or 8.4 TB in this example. Thus, additional storage devices may be added to the camera or system to meet the storage requirements. For example, if the previous storage of a camera is more than the calculated requirement, such as where the user installed a 20 TB drive where the calculated requirement is 8.4 TB, there are some actions that may be performed for the excessive storage. If the excessive storage is for a single camera or system, the excessive storage may be assigned to other cameras or surveillance systems. Alternatively, the excessive storage may be assigned to non-video related tasks, such as cryptocurrency mining, like Chia. Another use for the excessive storage may include modifying the data retention policy for the video surveillance.

In some embodiments, object detection 242 and/or scene identification processing 248 may be executed remotely, such as in a cloud-based system that enables specialized processing and memory resources.

Figure 3:
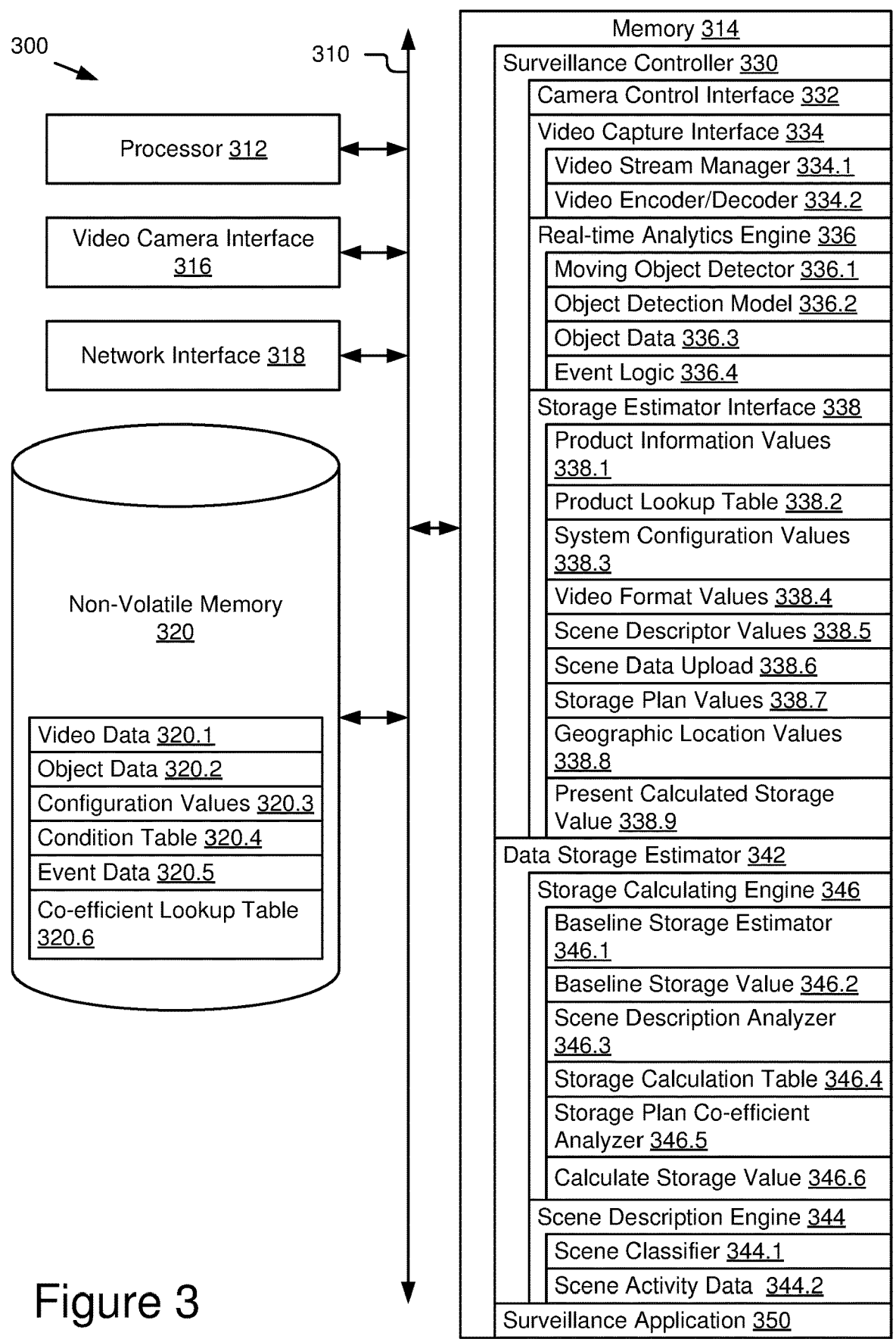
FIG. 3 schematically illustrates some elements of the computer-based surveillance system of FIG. 1.

FIG. 3 schematically shows selected modules of a surveillance system 300 configured for estimating data storage based on usage. Surveillance system 300 may incorporate elements and configurations similar to those shown in FIGS. 1-2. For example, surveillance system 300 may be configured in a network video recorder similar to network video recorder 130. In some embodiments, one or more of the selected modules may access or be instantiated in the processors, memories, and other resources of video cameras configured for video capture, similar to video cameras 110, and/or user devices configured for video monitoring, similar to user device 170. For example, a video camera and its embedded or attached compute resources may be configured with some or all functions of video surveillance controller 330 to provide real-time video stream analysis in a distributed fashion at the edge of surveillance system 300 before selectively providing the video stream and generated metadata to other system components, such as a network video recorder or user device, for additional analytics and/or use in a surveillance application. In some embodiments, data storage estimator 342 may be embodied in a network video recorder, VSaaS server, user device, and/or specialized storage estimator system.

Surveillance system 300 may include a bus 310 interconnecting at least one processor 312, at least one memory 314, and at least one interface, such as video camera interface 316 and network interface 318. Bus 310 may include one or more conductors that permit communication among the components of surveillance system 300. Processor 312 may include any type of processor or microprocessor that interprets and executes instructions or operations. Memory 314 may include a random access memory (RAM) or another type of dynamic storage device that stores information and instructions for execution by processor 312 and/or a read only memory (ROM) or another type of static storage device that stores static information and instructions for use by processor 312 and/or any suitable storage element such as a hard disk or a solid state storage element. In some embodiments, processor 312 and memory 314 may be compute resources available for execution of logic or software instructions stored in memory 314 and computation intensive tasks, such as real-time analytics engine 336, may be configured to monitor and share these resources.

Video camera interface 316 may be configured for connection with one or more video cameras. For example, video camera interface 316 may include a plurality of ethernet ports and supporting protocols compatible with PoE standards for connecting to a plurality of cameras. In some embodiments, video camera interface 316 may include a PoE network switch for providing power to connected cameras and routing data packets to and from connected cameras, such as control and video data. Video camera interface 316 may not be included in some systems, particularly where surveillance controller 330 is substantially embodied in "smart cameras" and network interface 318 provides substantially all communication with other system components.

Network interface 318 may include one or more wired or wireless network connections to network, similar to network 102. Network interface 318 may include a physical interface, such as an ethernet port, and related hardware and software protocols for communication over the network, such as a network interface card or wireless adapter.

Surveillance system 300 may include one or more non-volatile memory devices 320 configured to store video data. For example, non-volatile memory devices 320 may include a plurality of flash memory packages organized as an addressable memory array and/or one or more solid state drives or hard disk drives. In some embodiments, non-volatile memory devices 320 may include a plurality of storage devices within, attached to, or accessible by a network video recorder for storing and accessing video data.

Surveillance system 300 may include a plurality of modules or subsystems that are stored and/or instantiated in memory 314 for execution by processor 312 as instructions or operations. For example, memory 314 may include a surveillance controller 330 configured to control at least one video camera, capture and store video streams from that camera, provide real-time analytics, and enable user access, such as through surveillance application 350. Memory 314 may include a data storage estimator configured to calculate an estimate of storage requirements based on usage. Memory 314 may include a surveillance application configured to provide a user interface for monitoring, reviewing, and managing surveillance video and/or surveillance system 300.

Surveillance controller 330 may include interface protocols, functions, parameters, and data structures for connecting to and controlling cameras, capturing and storing video data from those cameras, and interfacing with data storage estimator 342 and surveillance application 350. For example, surveillance controller 330 may be an embedded firmware application and corresponding hardware in a network video recorder configured for network and/or direct communication with a set of associated video cameras. Surveillance controller 330 may be configured as a central collection point for video streams from the associated video cameras that enables analysis of captured video data by analytics engines and presentation of video streams and video event alerts to a user through surveillance application 350. In some embodiments, surveillance controller 330 may be an embedded firmware application and corresponding hardware in or directly associated with a video camera or video camera array. In some embodiments, the functions for surveillance controller 330 may be divided among one or more video cameras and a network video recorder, network video server, and/or user device.

In some embodiments, surveillance controller 330 may include a plurality of hardware and/or software modules configured to use processor 312 and memory 314 to handle or manage defined operations of surveillance controller 330. For example, surveillance controller 330 may include a camera control interface 332, a video capture interface 334, a real-time analytics engine 336, a video storage interface 338, and an access and display manager 340.

Camera control interface 332 may include camera interface protocols and a set of functions, parameters, and data structures for using, configuring, communicating with, and providing command messages to cameras through video camera interface 316 and/or network interface 318. For example, camera control interface 332 may include an API and command set for interacting with control circuit in each camera to access one or more camera functions. In some embodiments, camera control interface 332 may be configured to set video configuration parameters for camera image sensors, microphones, and/or video encoders, access pan-tilt-zoom features, set or modify camera-based motion detection, tripwire, object detection, and/or low light detection parameters, and/or otherwise manage operation of cameras. For example, camera control interface 332 may maintain a video camera configuration table, pages, or similar data structures that includes entries for each video camera being managed and their respective camera-specific configuration parameters, active control features (such as PTZ control), and other configuration and control information for managing the cameras. In some embodiments, each camera may be assigned a unique camera identifier that may be used by surveillance controller 330, data storage estimator 342, and/or surveillance application 350 to associate video data with the camera from which it was received. In some embodiments, camera control interface 332 may include one or more control features within a video camera to allow surveillance controller 330 to access camera control systems, such as PTZ motor controls, lens focus, filters, and other camera subsystems.

Video capture interface 334 may include camera interface protocols and a set of functions, parameters, and data structures for receiving video streams from associated cameras and/or video image sensors. For example, video capture interface 334 may include video data channels and related data buffers for managing a plurality of camera video data streams. In some embodiments, each video camera may be allocated a dedicated video channel for continuously and/or selectively sending its video stream to video capture interface 334. For example, received video streams may be buffered by video capture interface 334 before being streamed to real-time analytics engine 336, video storage interface 338, and access/display manager 340. In some embodiments, video capture interface 334 may be configured to selectively stream video data to data storage estimator 342 during a configuration stage. In some embodiments, video capture interface 334 may receive or generate camera video metadata describing the camera video format, time and location information, and event or condition tags based on on-board camera analytics.

In some embodiments, video capture interface 334 may include a video stream manager 334.1 configured to identify and manage the plurality of video streams being received from the cameras or video image sensors within a camera. For example, video stream manager 334.1 may manage video buffer allocation and space, processing of video streams from a camera video format or raw video format to another video format, and directing buffered video frames through real-time analytics engine 336. In some embodiments, video stream manager 334.1 may selectively send video streams to data storage estimator 342 for scene video data upload and/or provide a notification to data storage estimator 342 of the availability and storage location of video data for analysis in non-volatile memory 320 (as determined by a video storage interface, not depicted). In some embodiments, video stream manager 334.1 may include configurable video paths. For example, the real-time analytics path (through real-time analytics engine 336), the storage path (through video storage interface), the display path (through access/display manager), and/or the storage estimation path (through data storage estimator 342) may each be configured for specific processing, priority, and timing, including selective allocation of compute resources to support each video path.

In some embodiments, video stream manager 334.1 may be configured to use encoder/decoder 334.2 to encode video data, such as raw video data, in a desired video format. For example, encoder/decoder 334.2 may receive raw video frames in accordance with a defined frame rate and resolution to generate a time-dependent video stream that may be further processed according to a selected video codec and corresponding compression scheme. In some embodiments, encoder/decoder 334.2 may be used to decode camera video streams in a first (camera) video format and re-encode them in one or more other formats. For example, video stream manager 334.1 may use encoder/decoder 334.2 to change the resolution, image size, frame rate, codec, compression factor, color/gray-scale, or other video format parameters.

Real-time analytics engine 336 may include one or more video analytics models and a set of functions, parameters, and data structures for processing video streams from associated cameras and/or video image sensors to enable real-time or near-real-time response to objects in the video stream. In some embodiments, real-time analytics engine 336 may include at least one moving object detector 336.1 configured to determine the presence in a video of an object type or class in motion.

In some embodiments, moving object detector 336.1 may be configured for one or more object types, sometimes referred to as an object class, such as people, faces, cars, license plates, etc. Moving object detector 336.1 may include an object detection model 336.2, such as a neural network algorithm, trained with data sets targeting the object types of interest. In some embodiments, real-time analytics engine 336 may be configured for a plurality of object types and include object detectors trained to each object type. Moving object detector 336.1 may be configured to return data detection output data including object data 336.3. For example, object data 336.3 may include position information, such as bounding box coordinates, and object type or class. Event logic 336.4 may include a plurality of event conditions based on detected data objects and whether other systems or subsystems should be notified of the object detection event. These event conditions may include logical evaluation of one or more parameters from the output data, generally comparing output data parameters to corresponding event threshold parameters for determining an event. As another example, event logic 336.4 may include descriptive information of an AI-event occurring, such as a recognized vehicle entering a driveway or a person approaching a doorway. In one embodiment, bounding boxes representing a recognized object may be compared to past scene video data, as an example. By comparing bounding boxes of moving objects to reference scene data retrieved from a reference data source, an AI-event may be recognized as occurring, such as a vehicle with a recognized license plate entering a driveway. In some embodiments, object data 336.3 may be stored in an object data structure 320.2 in non-volatile memory 320, such as an object data table or metadata tags associated with video data 320.1.

Storage estimator interface 338 may enable the application of one or more product information values 338.1 to the retrieval of system configuration values 338.3 from a product lookup table 338.2. In some embodiments, product information values 338.1 may be inputted via a user interface on a user device connected through a network interface 318 and stored in configuration values 320.3 in non-volatile memory 320. Example product information values 338.1 include a camera manufacturer model number or a web link that identifies the camera product.

In some embodiments, storage estimator interface 338 may be configured to use the product information values 338.1 in the product lookup table 338.2 to retrieve system configuration values 338.3, such as recording mode and data retention plan, and video format values 338.4, such as video compression format, video resolution, frames per second, and video quality.

In some embodiment, storage estimator interface 338 may be configured to receives scene descriptor values 338.5 based on scene data upload 338.6, where the scene descriptor values 338.5 are received from a scene description engine 344 that uses a scene classifier 344.1 to process scene activity data 344.2 as transformed from the scene data upload 338.6.

For example, data storage estimator 342 may include the scene description engine 344 that may determine a number of scene descriptor values applicable to different situations that occur in the video data based on the physical location and likely scene activities within the field of view of a particular camera. For example, different scene descriptor values may describe time of day, such as at night or during the day, during working hours or when a facility is closed. Additionally, scene descriptor values may include scene activity level, such as a metric measuring activity of moving objects in the view of the camera. In some embodiments, a variety of scene descriptor values may be mapped to corresponding conditions in a condition table 320.4 stored in non-volatile memory 320. For example, a matrix of condition values for different scene descriptors may correspond to one or more scene descriptor values for determining a recording co-efficient value in a co-efficient lookup table 320.6 stored in non-volatile memory 320. In some embodiments, scene descriptors include an object type, location in video frame, time, state of motion, etc. In other embodiments, scene descriptors may include general descriptions of the camera view, such as living room, kitchen, bedroom, outdoor, indoor, doorbell, garage, window, balcony, commercial, residential, industrial, and office.

In some embodiments, a scene description analyzer 346.3 may be configured to determine one or more scene descriptor values 338.5 from the scene video data upload 338.6, metadata, or other data available to the system. For example, scene classifier 344.1 may evaluate video timestamps and tags or metadata related to motion, to generate scene activity data 344.2, where the scene activity data 344.2 includes a metric of the scene activity (e.g., a busy street of moving cars would have a higher scene activity score than a quiet side street with less activity based on the number of counted triggers, or triggering events or detected objects in motion). For example, location metadata may indicate the camera is located in a particular geographic location having a geographic location value 338.8. In some embodiments, scene classifier 344.1 may use the geographic location value 338.8, along with system configuration values 338.3, to determine an appropriate region-specific recording co-efficient value stored in the co-efficient lookup table 320.6. For example, the scene classifier 344.1 of the scene description engine 344 may generate scene descriptor values 338.5 for identified scene activity data 344.2 to index condition table 320.4 and determine the corresponding scene descriptor values 338.5.

In some embodiments, event logic 336.4 may include logical rules configured to trigger video camera control, video storage, analytics, and/or user notification responses to real-time analytics. For example, event logic 336.4 may be embodied in a rules engine that receives and/or maintains state information for triggers and outputs of camera control interface 332, video capture interface 334, real-time analytics engine 336, video storage interface, and/or access/display manager to determine system responses to generated video streams and related conditions and analysis. In some embodiments, event logic 336.4 may be configured to generate alerts and/or notifications in response to a set of predefined event conditions. For example, when an object of a particular object type is detected in the video stream, an object detection notification or alert may be generated and sent to a user through access/display manager and/or surveillance application 350. Similarly, in an object tracking context, an object exit event may trigger an object exit notification to the user. In some embodiments, event logic 336.4 may determine events that are used as triggers for operations by other systems. For example, an object detected event may determine a change in how raw video data is processed by video capture interface (such as increasing resolution of the resulting encoded video data), how the video cameras are positioned by camera control interface 332 (such as using PTZ control to change the field of view), where the resulting video is stored by video storage interface, and/or how access privileges are assigned for use by access/display manager 340. In some embodiments, event logic 336.4 may generate an event notification and send it over a network to surveillance application 350 to automatically execute one or more user-defined display, alert, system control, deep analytics, and/or metadata operations. In some embodiments, an AI-event may trigger the camera to start recording. Based on this recording mode, different co-efficient values may be stored in the co-efficient lookup table 320.6.

In some embodiments, data storage estimator 342 may include a storage calculating engine 346 for generating storage calculations in collaboration with the storage estimator interface 338. For example, storage calculating engine 346 may include a baseline storage estimator 346.1 to calculate a baseline storage value 346.2 based on the system configuration values 338.3 and video format values 338.4. In some embodiments, storage calculating engine 346 may include a scene description analyzer 346.3 for analyzing scene data upload 338.6 to determine object data 336.3 and use event logic 336.4 to determine scene descriptor values 338.5 based on similar object data 320.2 and event data 320.5 and conditions in condition table 320.4. For example, scene classifier 344.1 may include logic for tracking moving objects, measuring scene activity, and/or other parameters for determining scene activity data 344.2 that correlates to one or more scene descriptor values 338.5 in condition table 320.4 for use in retrieving a recording co-efficient value in the co-efficient lookup table 320.6. This recording co-efficient value may be stored in a storage calculation table 346.4. Separately, in one embodiment, a storage plan co-efficient analyzer 346.5 may determine a storage plan co-efficient value based on the storage plan value 338.7 as determined by the system configuration values 338.3 and/or selected through a user interface by the storage estimator interface 338. An estimated storage value may be calculated 346.6 by calculating the product of the baseline storage value 346.2, the recording co-efficient value stored in the storage calculation table 346.4, and the storage plan co-efficient determined by the storage plan co-efficient analyzer 346.5. This calculated storage value is presented 338.8 by the storage estimator interface 338.

Video storage interface may include storage interface protocols and a set of functions, parameters, and data structures for managing storage of video data in non-volatile memory 320, such as storage devices and/or network video storage, for later retrieval and use by access/display manager and/or data storage estimator 342. For example, video storage interface may write camera video stream data from video data buffers and/or storage path video data from video capture interface 334 to non-volatile memory 320 as video data 320.1. In some embodiments, video storage interface may include a storage manager configured to manage video storage space in non-volatile memory 320 in accordance with one or more data retention and/or data archiving schemes. For example, surveillance system 300 may support continuous and/or triggered recording of video data from associated cameras and the storage manager may include logic for enforcing a data retention and overwriting policy whereby the fixed storage space of non-volatile memory 320 is recycled for storing a recent period of captured video, video data meeting specific retention criteria, and/or deleting or archiving video data after one or more periods of time defined in the data retention policy. Video storage interface may also include a metadata manager to receive and store video metadata as tags or metadata tracks in the video data or in an associated metadata table, file, or similar data structure associated with the corresponding video data objects. In some embodiments, the metadata manager may be configured to include object data 320.2, calibration values 320.3, condition table 320.4, and/or event data 320.5. For example, object data 320.2 may include bounding box coordinates and object type tags for each object detected within a video stream and event data 320.5 may include timestamps and event types for event occurrences in the video stream.

Access/display manager may include APIs and a set of functions, parameters, and data structures for displaying video from video capture interface 334 and/or video storage interface to a user display application, such as surveillance application 350. For example, access/display manager may include a monitoring or display configuration for displaying one or more video streams in real-time or near real-time on a graphical user display of a user device and/or receive video navigation commands from the user device to selectively display stored video data from non-volatile memory 320. In some embodiments, access/display manager may maintain an index of real-time/near real-time video streams and/or stored or archived video streams that are available for access by surveillance application 350. In some embodiments, the video index may include a corresponding metadata index that includes video data parameters (e.g., time, location, camera identifier, format, low light/normal light, etc.), detected video event metadata (event time, location, type, parameters, etc.), and/or video management parameters (expiration, active/archive, access control, etc.) for use in displaying and managing video data. Access/display manager may be configured to support surveillance application 350 when instantiated in the same computing device as surveillance controller 330, directly attached to the computing device hosting surveillance controller 330, and/or via a network within a LAN, WAN, VPN, or the internet. In some embodiments, access/display manager 340 may provide selective access to user video streams allocated by video capture interface 334 to the user video path.

Data storage estimator 342 may include interface protocols, functions, parameters, and data structures for analyzing video data and output data from moving object detector 336.1 to determine scene descriptor values and corresponding recording co-efficient values. For example, data storage estimator 342 may be an embedded firmware application and corresponding hardware in a network video recorder, VSaaS server, or separate storage estimator system in communication with surveillance controller 330. In some embodiments, data storage estimator 342 may run on a separate computing device from surveillance controller 330. In some embodiments, data storage estimator 342 may be active during a configuration stage until calculated storage values are provided to real-time analytics engine 336 and may then be disconnected, uninstalled, or otherwise removed from surveillance system 300. In some embodiments, data storage estimator 342 may include a plurality of hardware and/or software modules configured to use processor 312 and memory 314 to handle or manage defined operations of data storage estimator 342. For example, data storage estimator 342 may include a storage calculating engine 346 and a scene description engine 344.

Storage calculating engine 346 may include a set of functions, parameters, and data structures for calculating storage requirements based on various inputs. For example, storage calculating engine 346 includes a baseline storage estimator 346.1 that may be configured to receive system configuration values 338.3, stored as configuration values 320.3 in non-volatile memory 320 received from surveillance controller 330 though storage estimator interface 338 to generate a baseline storage value 346.2. In some embodiments, storage calculating engine 346 may include a scene description analyzer 346.3 that may be configured to receive scene data upload 338.6 from the surveillance controller 330 through the storage estimator interface 338 and analyze the scene using the scene description engine 344 in conjunction with the real-time analytics engine 336. The scene description engine 344 may be configured to include a scene classifier 344.1 that generates scene activity data 344.2 based on a moving object detector 336.1 and object detection model 336.2. The scene description engine 344 generates the scene activity data 344.2 by comparing the object data 336.3 and event logic 336.4 to similar object data 320.2 and event data 320.5 as refenced in condition table 320.4, where the scene activity data 344.2 is associated with scene descriptor values 338.5 used to retrieve recording co-efficient values in the co-efficient lookup table 320.6. For example, an empirical lookup table or model can be used to estimate how busy the scene based on the number of event triggers per day and thus get the co-efficient Cm (motion trigger) or Ce (event trigger). The lookup table or model may be generated based on video data from cameras in the nearby area, or region-specific empirical data, and stored, in aggregate, in a reference source, as an example.

Storage estimator interface 338 may include an API and functions, parameters, and data structures for exchanging data between surveillance controller 330 and data storage estimator 342. For example, storage estimator interface 338 may interact with real-time analytics engine 336 in surveillance controller 330 to send and receive data over internal or network protocols and/or through storage to non-volatile memory 320.

Surveillance application 350 may include interface protocols, functions, parameters, and data structures for providing a user interface for monitoring and reviewing surveillance video and/or managing surveillance system 300, such as through surveillance controller 330. For example, surveillance application 350 may be a software application running on a user device integral to, connected to, or in network communication with surveillance controller 330 and/or a hosting network video recorder. In some embodiments, surveillance application 350 may run on a separate computing device from surveillance controller 330, such as a personal computer, mobile device, or other user device. In some embodiments, surveillance application 350 may be configured to interact with APIs presented by access/display manager.

In some embodiments, surveillance application 350 may include a plurality of hardware and/or software modules configured to use processor 312 and memory 314 to handle or manage defined operations of surveillance application 350. For example, surveillance application 350 may include a video manager, an alert manager, and an analytics manager.

The video manager may include APIs and a set of functions, parameters, and data structures for navigating and displaying video streams from video cameras accessed through surveillance controller 330. For example, the video manager may include a graphical user interface and interactive controls for displaying lists, tables, thumbnails, or similar interface elements for selecting and displaying video streams for particular cameras, times, locations, and/or events. In some embodiments, the video manager may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, the video manager may include a data structure summarizing all video data stored in surveillance system 300 to enable the user to locate and view older surveillance video. For example, a video management log or datastore may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.).

The alert manager may include APIs and a set of functions, parameters, and data structures for setting, monitoring, and displaying alerts based on detected video events. For example, the user may define a set of trigger events that generate visual, audible, tactile, and/or notification-based (electronic mail, text message, automated call, etc.) alerts to a user device. In some embodiments, the alert manager may include a plurality of preset alert conditions with associated event parameters and enable a user to enable and disable alert types and/or change associated event parameters. In some embodiments, the alert manager may be configured to operate in conjunction with event overlay function to overlay graphical elements representing detected events or event indicators on video streams displayed through the video manager. For example, detected motion, objects, or faces may be boxed or highlighted, tagged with relevant identifiers, or otherwise indicated in the video playback on the user device.

The analytics manager may include APIs and a set of functions, parameters, and data structures for selecting, training, and managing event detection algorithms. For example, the analytics manager may include a user interface to analytical model library for one or more analytics engines. In some embodiments, the event detection algorithms may include a set of parameters and/or model weights that are preconfigured based on training data sets processed independent of surveillance system 300. For example, the analytics manager may include object detection algorithms for common objects, situations, and camera configurations. In some embodiments, the analytics manager may include access to training services and/or preconfigured training data sets. For example, the analytics manager may enable the user to define training data sets for determining or refining event detection algorithm parameters and/or model weights based on predefined base algorithms or models. In some embodiments, the analytics manager may also enable user control of the calibration stage and operations of data storage estimator 342. In some embodiments, the analytics manager may interface directly with real-time analytics engine 336 for selecting, training, managing, and using the event detection algorithms configured through the analytics manager. In some embodiments, the analytics manager may interface with access/display manager for accessing and managing real-time analytics engine 336 and/or one or more analytics engines supporting deep analytics through the network video recorder, VSaaS server, etc.

Figure 4:
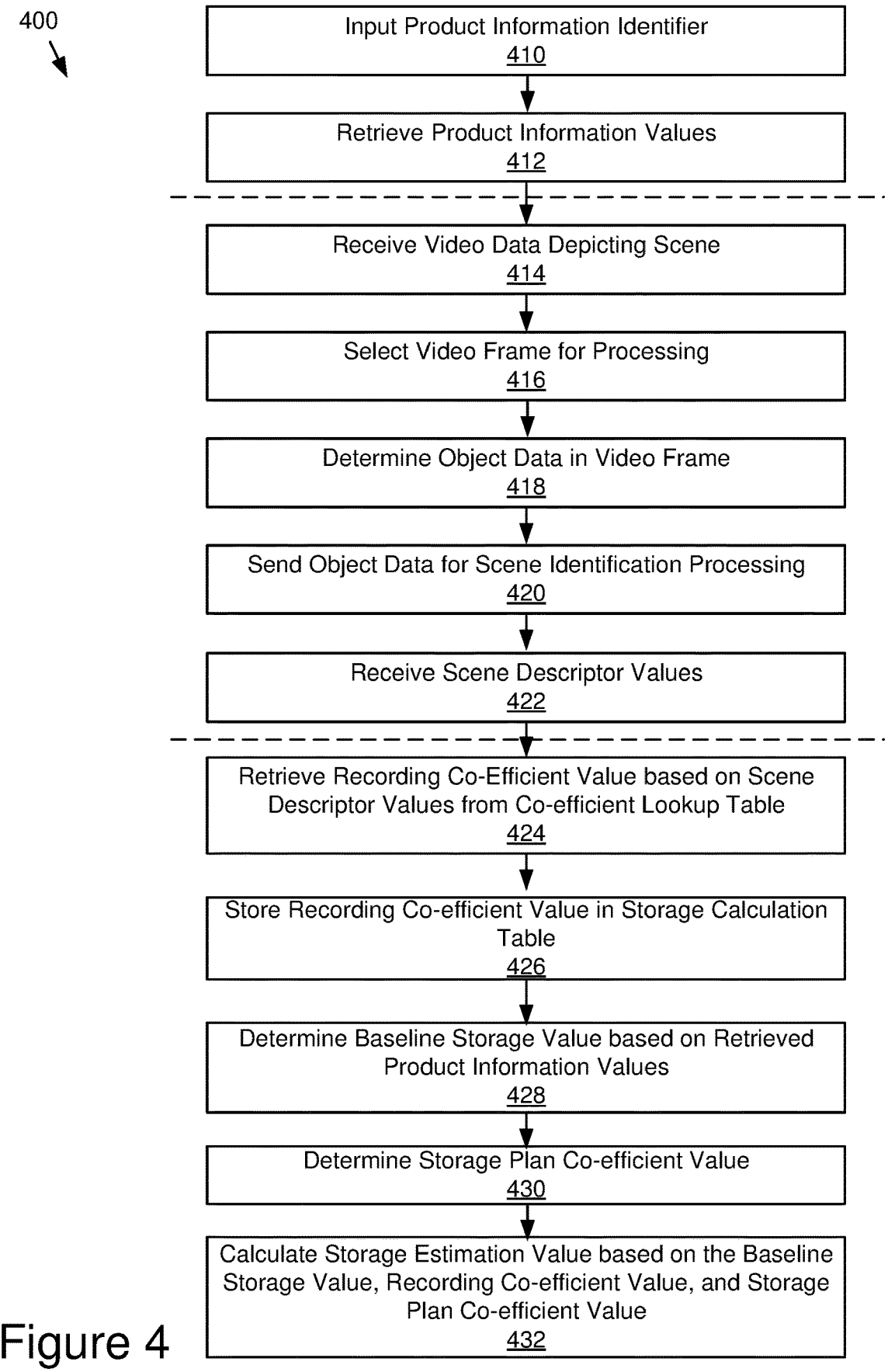
FIG. 4 is a flowchart of an example method of calculating storage estimation value for a surveillance video camera.

As shown in FIG. 4, surveillance system 300 may be operated according to an example method of calculating storage estimation value for a surveillance video camera, i.e., according to method 400 illustrated by blocks 410-432 in FIG. 4.

At block 410, a product information identifier may be inputted into a user interface. For example, the model number or a web link to product information for a video camera may be inputted into a user interface on an application connected to a storage estimator system.

At block 412, product information values are retrieved. For example, product information values may be retrieved from a product lookup table where the identifier is a model number. As another example, where the identifier is a web link, the product information values may be retrieved from the website associated with the web link.

At block 414, video data depicting a scene is received. For example, a surveillance controller may receive or generate encoded video data from a user device connected to the surveillance system or the video camera.

At block 416, a video frame may be selected for processing. For example, the real-time analytics engine may select video frames in real-time or near-real time for processing.

At block 418, object data may be determined in the video frame. For example, a moving object detector may detect an object in motion in the video frame and return object data.

At block 420, the object data may be for scene identification processing. For example, the object data may be sent from the real-time analytics engine to a storage estimator interface and to a scene description engine.

At block 422, scene descriptor values may be received. For example, the scene description analyzer may receive one or more scene descriptor values that identify scene activity data from the scene description engine based on past empirical data stored in a condition table in non-volatile memory. In some embodiments, block 414-422 may be repeated periodically or for each video frame during the scene descriptor generation.

At block 424, recording co-efficient value is retrieved by the scene description analyzer based on scene descriptor values from co-efficient lookup table. For example, a data storage estimator may retrieve a recording co-efficient value based on the scene descriptor values in the co-efficient lookup table.

At block 426, the recording co-efficient value may be stored. For example, the data storage estimator may store the recording co-efficient value in a storage calculation table for use during storage calculation.

At block 428, baseline storage value is determined based on retrieved product information values. For example, a baseline storage estimator of a storage calculating engine may determine a baseline storage value based on system configuration values and video format values determined from the retrieved product information values.

At block 430, a storage plan co-efficient value is determined. For example, the storage calculating engine may determine a storage plan co-efficient value based on a selected storage plan as received from the storage estimator interface. In an embodiment, the storage plan co-efficient value is one (1) based on the selected storage plan to be local storage on the camera. As a result, this block may be optional depending on the selected storage plan.

At block 432, a storage estimation value is calculated based on the baseline storage value, recording co-efficient value, and storage plan co-efficient value. For example, the storage calculating engine may calculate the storage estimation value as the product of the baseline storage value, recording co-efficient value, and storage plan co-efficient value.

Figure 5:
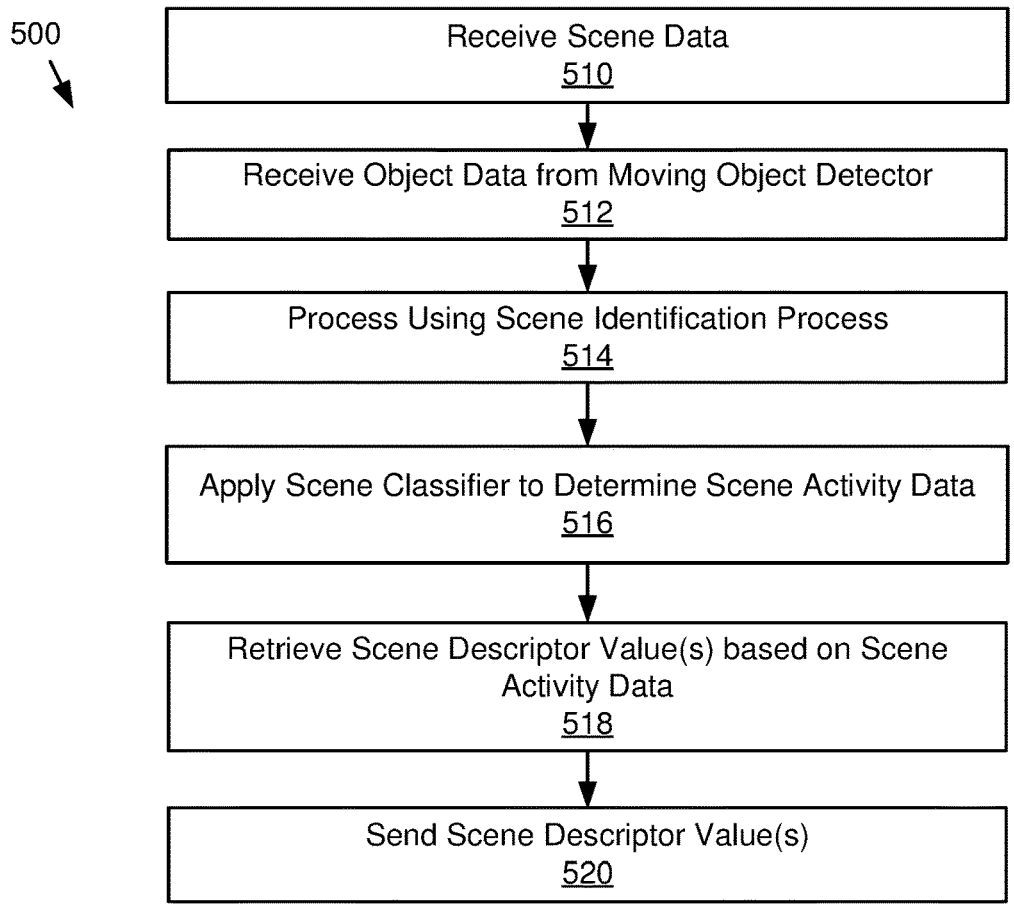
FIG. 5 is a flowchart of an example method of determining scene descriptor values during scene descriptor generation.

As shown in FIG. 5, surveillance system 300 may be operated according to an example method for determining scene descriptor values during scene descriptor generation, i.e., according to method 500 illustrated by blocks 510-520 in FIG. 5.

At block 510, scene data may be received. For example, a surveillance controller, through a storage estimator interface, may receive video data depicting a scene and send it to a scene description engine for processing.

At block 512, object data may be received from a moving object detector. For example, the surveillance controller may send object data related to detected data objects from its moving object detector to the scene description engine for processing.

At block 514, video data may be processed using a scene identification process. For example, the scene description engine may be used to identify one or more scene descriptor values from past empirical data of similar scenes, such as outdoors, driveway, and/or cars entering driveway.

At block 516, a scene classifier may be applied to determine scene activity data. For example, the scene description engine may apply a scene classifier for determining a level of activity in the scene, such as a busy street or a less busy street, where categories of scene activity include high, medium, and low.

At block 518, scene descriptor value(s) may be retrieved based on scene activity data. For example, the scene description engine may retrieve scene descriptor value(s) from a condition table in non-volatile memory based on the scene activity data as measured from past empirical data of similar scenes. Additionally, region-specific scene descriptor value(s) may be retrieved based on the geographic location of the camera, in an embodiment.

At block 520, scene descriptor value(s) are sent. For example, the scene description engine may send relevant scene descriptor value(s) based on the detected objects in the scene data, scene activity, and region-specific descriptor values.

Figure 6:
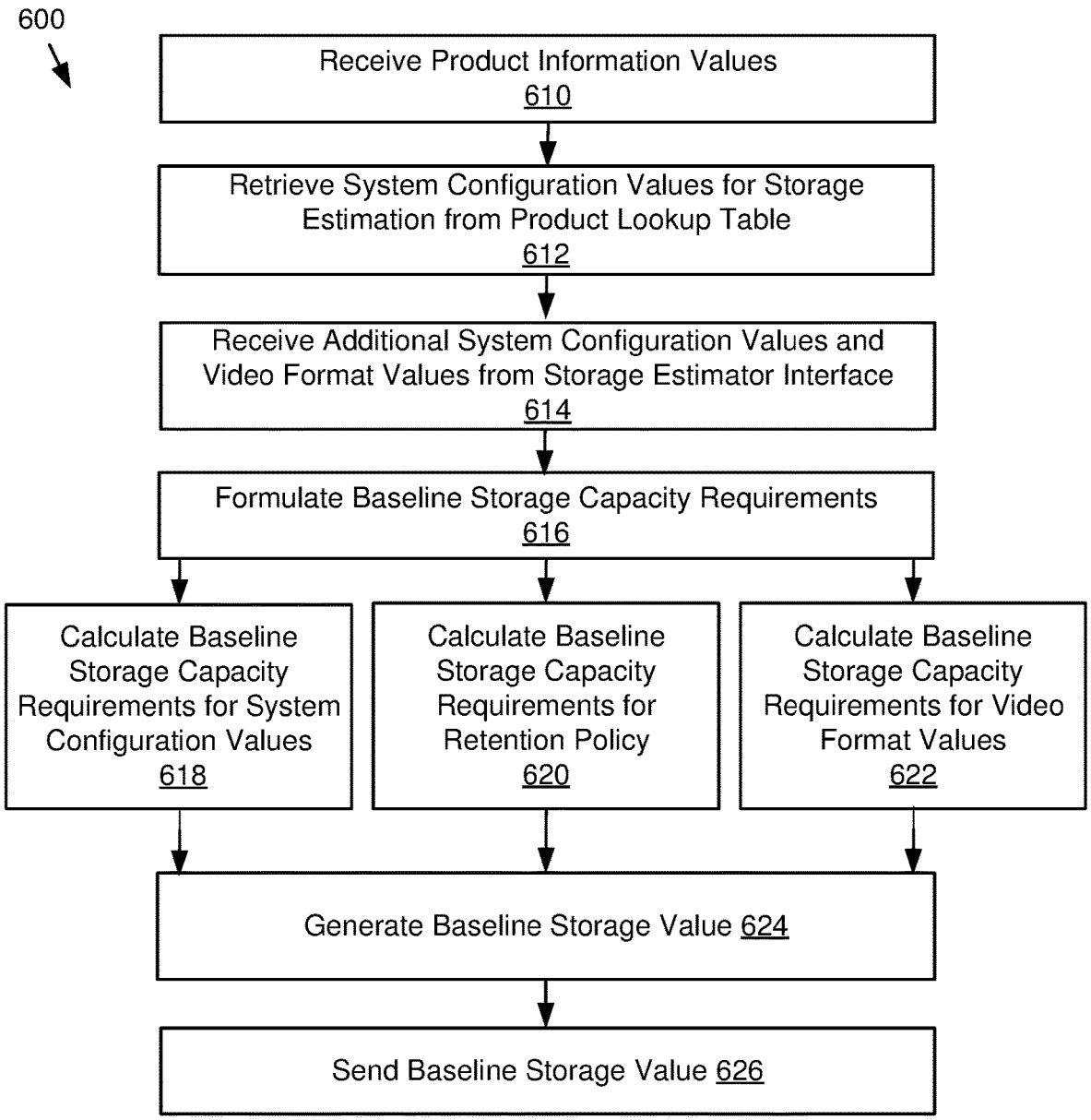
FIG. 6 is a flowchart of an example method of formulating baseline storage capacity.

As shown in FIG. 6, surveillance system 300 may be operated according to an example method for formulating baseline storage capacity, i.e., according to method 600 illustrated by blocks 610-626 in FIG. 6.

At block 610, product information values may be received. For example, a baseline storage estimator may receive product information values from a storage estimator interface.

At block 612, system configuration values for storage estimation may be retrieved from product lookup table. For example, various system configuration values may be retrieved, such as compatible storage media and maximum storage capacity.

At block 614, additional system configuration values and video format values from storage estimator interface is received. For example, the storage estimator interface may receive, through a user interface, a selection of additional system configuration values, such as number of cameras, a data retention policy, recording mode selection, and video format values. The number of cameras may be received through a camera enumeration selector, in one embodiment, such as a drop-down menu, text field, or other type of user interface element.

At block 616, baseline storage capacity requirements may be formulated. For example, the baseline storage estimator formulates the baseline storage capacity requirements given the system configuration values, data retention policy, and video format values.

At block 618, the baseline storage capacity requirements for system configuration values may be calculated. For example, the baseline storage estimator may determine a maximum storage capacity requirements based on the system configuration values.

At block 620, the baseline storage capacity requirements for retention policy may be calculated. For example, the baseline storage estimator may determine a maximum storage capacity requirements based on the data retention policy.

At block 622, the baseline storage capacity requirements for video format values may be calculated. For example, the baseline storage estimator may determine a maximum storage capacity requirements based on the video format values.

At block 624, a baseline storage value may be generated. For example, the baseline storage estimator may combine the determined maximum storage capacity requirements based on the system configuration values, the data retention policy and the video format values. In this way, a maximum storage data value is generated as the baseline storage value.

At block 626, baseline storage value may be sent. For example, the baseline storage value may be sent to the storage calculating engine.

Figure 7:
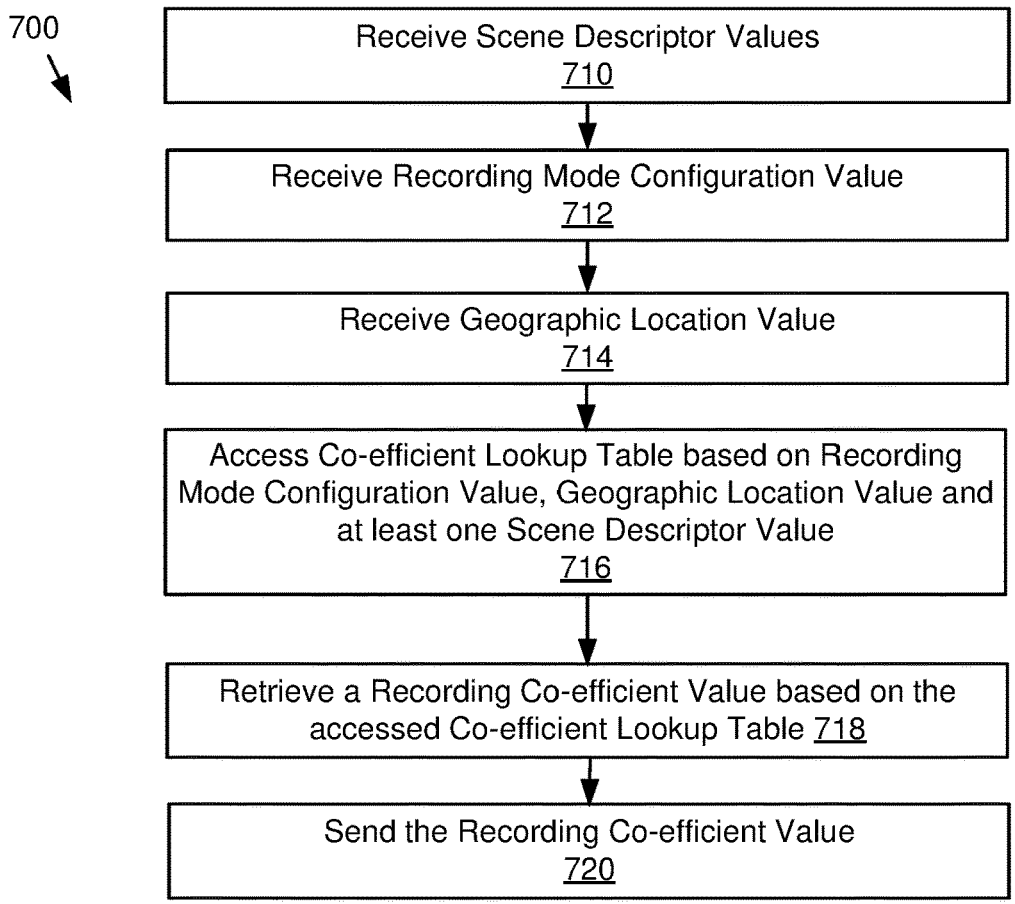
FIG. 7 is a flowchart of an example method of determining a recording co-efficient value based on scene descriptor values.

As shown in FIG. 7, surveillance system 300 may be operated according to an example method for determining a recording co-efficient value based on scene descriptor values, i.e., according to method 700 illustrated by blocks 710-720 in FIG. 7.

At block 710, scene descriptor values may be received. For example, the storage calculating engine may scene descriptor values associated with a scene.

At block 712, recording mode configuration value may be received. For example, storage calculating engine may receive the recording mode configuration value from the storage estimator interface, such as a continuous recording mode, a motion-triggered recording mode, or an event triggered recording mode.

At block 714, a geographic location value may be received. For example, the storage calculating engine may receive the geographic location value of the camera.

At block 716, co-efficient lookup table may be accessed based on recording mode configuration value, geographic location value, and at least one scene descriptor value. For example, the storage calculating engine may access the co-efficient lookup table using the recording mode configuration value, geographic location value (to obtain a region-specific co-efficient) and at least one scene descriptor value, such as outdoors, driveway, doorway, etc.

At block 718, a recording co-efficient value may be retrieved based on the accessed co-efficient lookup table. For example, a region-specific recording co-efficient value may be retrieved corresponding to the recording mode configuration value, geographic location value, and the at least one scene descriptor value.

At block 720, the recording co-efficient value may be sent. For example, the storage calculating engine may send the recording co-efficient value to a storage calculation table for storing.

Figure 8:
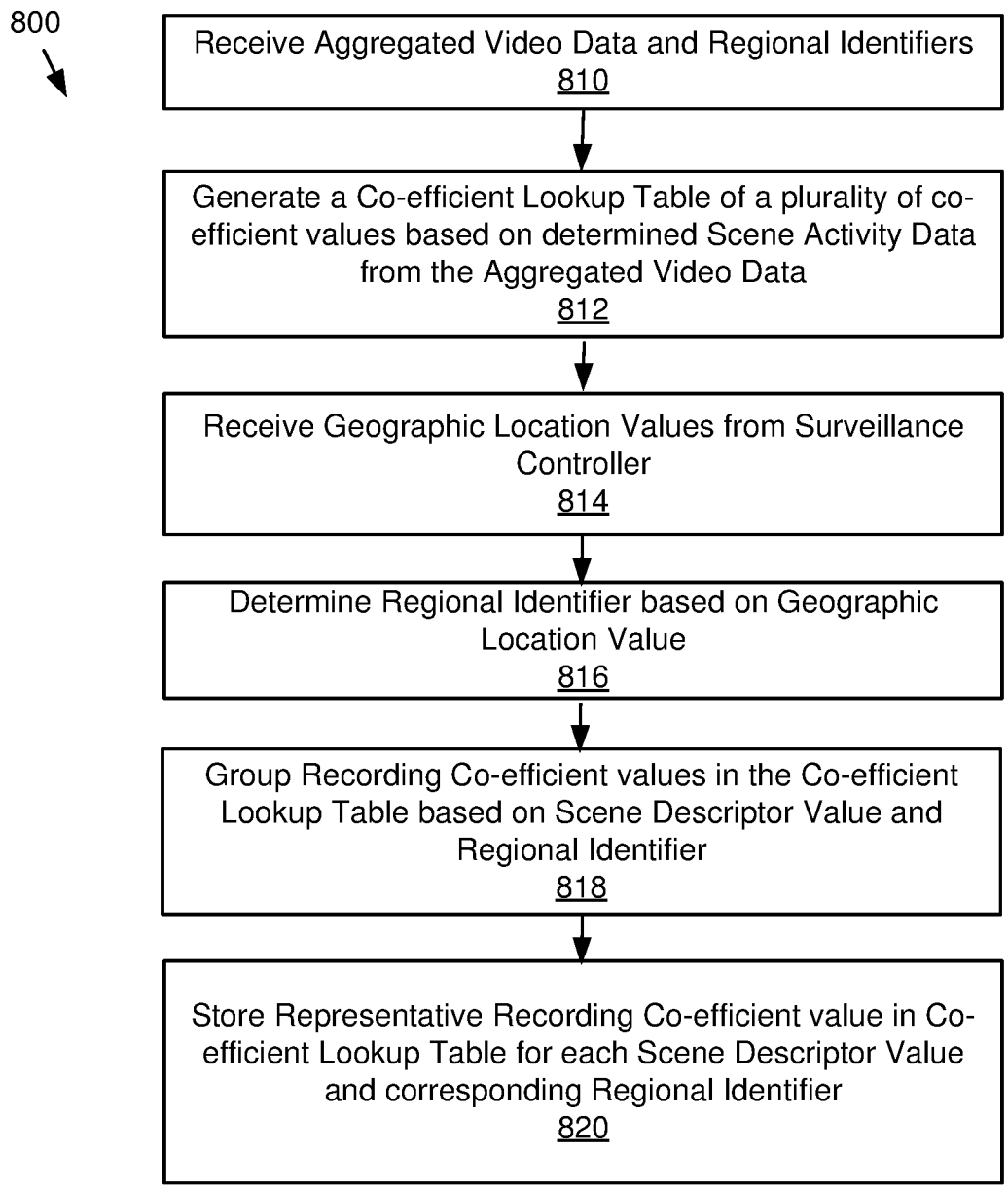
FIG. 8 is a flowchart of an example method of determining co-efficient values for determined scene activity data.

As shown in FIG. 8, surveillance system 300 may be operated according to an example method for determining co-efficient values for determined scene activity data, i.e., according to method 800 illustrated by blocks 810-820 in FIG. 8.

At block 810, aggregated video data and regional identifiers may be received. For example, a scene description engine may receive aggregated video data and corresponding regional identifiers from a system connected through a network interface.

At block 812, a co-efficient lookup table of a plurality of co-efficient values may be generated based on determined scene activity data from the aggregated video data. For example, the scene description engine may determine scene activity data by counting a number of triggers (by motion or by event) per day in each video of the aggregated video data. The scene activity data may then be transformed into a co-efficient lookup table based on a statistical analysis of the aggregated video data, in an embodiment. In other embodiments, other method of generating co-efficient values may be used.

At block 814, geographic location value may be received from surveillance controller. For example, geographic location metadata may be received from a surveillance controller.

At block 816, regional identifier may be determined based on geographic location value. For example, a regional identifier that uniquely identifies a region may be determined based on the received geographic location value. Thus, cameras located in the same region are associated with the same regional identifier.

At block 818, recording co-efficient values may be grouped in the co-efficient lookup table based on scene descriptor value and regional identifier. In this way, co-efficient values are grouped by region-specific data and same scene descriptor.

At block 820, a representative recording co-efficient value may be stored in the co-efficient lookup table for each scene descriptor value and corresponding regional identifier. For example, a representative co-efficient value for a recording mode, or recording type data value, may be selected based on a statistical analysis of the range of co-efficient values for each scene descriptor value and corresponding regional identifier associated with a particular recording mode.

As shown in FIGS. 9A and 9B, surveillance system 300 may be operated according to example graphical user interfaces for a method of calculating storage estimation value for a surveillance video camera system, i.e., according to example graphical user interface 900 illustrated by user interface elements 910-940 in FIGS. 9A and 9B.

At user interface element 910, an example graphical user interface screen is depicted in FIGS. 9A and 9B. FIG. 9A represents a blank input screen, in an embodiment. FIG. 9B represents a completed screen where the user has requested calculation of storage requirements based on usage.

At user interface element 912, a drop-down menu enables a user to select a number of cameras being used in the surveillance system. For example, the drop-down menu may include a list of number of cameras from 1 to a maximum of cameras.

At user interface element 914, a drop-down menu enables a user to select a number of days to store data, generating a data retention policy for the surveillance system. For example, the drop-down menu may include a list of number of days to store, such as 30, 60, and 90.

At user interface element 916, a drop-down menu enables a user to select a number of hours per day to record video data. For example, the drop-down menu may include a list of number of hours from 1 to 24.

At user interface element 918, a radio button selector enables a user to select a video compression format. For example, a user may select from MPEG, H.264, H.265, and H.265+ as depicted in FIGS. 9A and 9B.

At user interface element 920, a drop-down menu enables a user to select a resolution for video recording. For example, the drop-down menu may include a list of standard resolution sizes for video recording, such as 720p, 1080p, and 4K.

At user interface element 922, a radio button selector enables a user to select a video quality. For example, a user may select from High, Medium, and Low as depicted in FIGS. 9A and 9B.

At user interface element 924, a radio button selector enables a user to select a category of scene activity. For example, a user may select a category from High, Medium, and Low as depicted in FIGS. 9A and 9B.

At user interface element 926, a drop-down menu enables a user to select a frames per second for video recording. For example, the drop-down menu may include a list of frames per second values, such as 30, 60, 90, and so forth.

At user interface element 928, a radio button selector enables a user to select a recording mode. For example, a user may select from Continuous, Motion Triggered, and Event Triggered as depicted in FIGS. 9A and 9B.

At user interface element 930, a radio button selector enables a user to select a storage plan. For example, a user may select from Local, Cloud, and Mixed as depicted in FIGS. 9A and 9B.

At user interface element 932, a text input field enables a user to input a model number for a camera or system. This corresponds to a product information identifier, as described above. For example, upon entering a valid model number, system configuration values may be determined, as described above.

At user interface element 934, a text input field enables a user to input a web link for a camera or system. This corresponds to a product information identifier, as described above. For example, upon entering a valid web link, system configuration values may be determined, as described above.

At user interface element 936, a button labelled "Scene sample upload" enables a user to upload scene video data. Though not shown, a dialog box may appear for the user to select a video file upon selecting the "Scene sample upload" button, as an example. In an embodiment, at least one scene sample is uploaded for each camera. In an embodiment, if the user does not upload video data, text data may be inputted that describes the scene.

At user interface element 938, a button labeled "Calculate" enables a user to submit a request to estimate storage requirements based on usage. For example, upon the user selecting the button, the data captured in the graphical user interface 900 is sent to a data storage estimator for processing.

At user interface element 940, a display field enables a user to view an estimated calculation of storage requirements based on the inputted system configuration values. For example, the display field is populated after a user selects the "Calculate" button user interface element 938. In an embodiment, the graphical user interface 900 may be partially filled out. In another embodiment, a set of system configuration values may be pre-populated based on an inputted model number at user interface element 932 or web link at user interface element 934.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
a processor;
a memory;
a scene description controller configured to:
   receive scene video data depicting a view from a video image sensor at a camera location;
   determine, based on the scene video data, a scene description comprising at least one scene descriptor; and
   determine, based on the scene description, a category of scene activity of the view;
a data storage estimator configured to:
   determine a baseline data storage value based on a data storage plan associated with the video image sensor;
   determine a recording coefficient value based on the determined category of scene activity; and
   calculate a storage requirement based on:
      the baseline data storage value; and
      the recording coefficient value; and
a user interface data presenter configured to present the calculated storage requirement through a user interface of a user device.

2. The system of claim 1, wherein:
the data storage estimator is further configured to:
   receive product information about the video image sensor; and
   determine a data retention policy for the video image sensor; and
the baseline data storage value is further based on the product information and the data retention policy.

3. The system of claim 1, further comprising:
a video camera housing, wherein the video camera housing encloses:
   the video image sensor; and
   a surveillance controller configured to:
      receive video data from the video image sensor; and
      send, to the scene description controller, scene video data depicting the view from the video image sensor.

4. The system of claim 1, further comprising:
an object detector, wherein:
   the object detector includes:
      a motion model configured to determine a bounding box of moving objects in the scene video data; and
      an image classifier configured to detect an object of interest in the scene video data; and
   the scene description controller is further configured to:
      compare bounding boxes of moving objects to reference scene data retrieved from a reference data source;
      determine a metric of activity based on the comparison and the camera location; and
      determine the category of scene activity responsive to the metric of activity exceeding a predetermined threshold.

5. The system of claim 1, wherein the scene description controller is further configured to:
receive aggregated video data and regional identifiers;
generate a coefficient lookup data structure of a plurality of coefficient values based on determined scene activity data from the aggregated video data;
determine a representative coefficient value of the plurality of coefficient values for each scene descriptor value and corresponding regional identifier; and
store the representative coefficient value for each scene descriptor value and corresponding regional identifier in the co efficient lookup data structure table.

6. The system of claim 5, wherein:
the scene description controller is further configured to:
   count a number of triggers in the scene video data using a moving object detector; and
   determine the category of scene activity based on the number of triggers in the scene video data; and
the recording coefficient value in the coefficient lookup data structure is based on the number of triggers.

7. The system of claim 1, wherein:
the scene description controller is further configured to determine the scene description based on an analysis of the scene video data;
the analysis comprises selecting at least one scene descriptor from a set of scene descriptors that includes a plurality of scene descriptors selected from:
outdoor;
indoor;
doorbell;
garage;
window;
balcony;
commercial;
residential;
industrial; and
office; and
each scene descriptor is associated with a representative recording coefficient value in a coefficient lookup table.

8. The system of claim 1, wherein the scene description controller is further configured to receive the scene video data from at least one of:

a camera on the user device; and
the video image sensor at the camera location.

9. The system of claim 1, further comprising:
a user interface data selector, wherein:
the user interface data selector includes a video format selector configured to receive at least one of:
a user selection of video compression format;
a user selection of video quality;
a user selection of video resolution; and
a user selection of a number of frames per second; and
the data storage estimator is further configured to:
determine an updated baseline data storage value based on at least one of the user selection of video compression format, the user selection of video quality, the user selection of video resolution, and the user selection of the number of frames per second; and
determine the storage requirement based the updated baseline data storage value.

10. The system of claim 1, further comprising:
a user interface data selector, wherein:
the user interface data selector includes:
a data retention policy selector configured to receive at least one of:
a number of days to store video data; and
a number of hours per day to store video data; and
a camera enumeration selector configured to receive a number of cameras; and
the data storage estimator is further configured to:
determine an updated baseline data storage value based on at least one of the received number of days to store video data, the received number of hours per day to store video data, and the received number of cameras; and
determine the storage requirement based the updated baseline data storage value.

11. The system of claim 1, further comprising:
a user interface data selector configured to receive a product information indicator selected from:
a web link describing product information associated with the video image sensor; and
a user-inputted model number associated with the video image sensor;
wherein the data storage estimator is further configured to:
retrieve a set of product information values based on the product information indicator, wherein the set of product information values includes at least one of:
a video compression format data value;
a video quality data value;
a video resolution data value;
a frames per second data value;
a night vision data value;
a recording type data value;
a supported storage medium data value;
a maximum storage data value; and
a storage plan data value;
determine an updated baseline data storage value based on at least one product information value of the set of product information values; and
calculate the storage requirement based on the updated baseline data storage value.

12. The system of claim 1, wherein the data storage estimator is further configured to:
determine a plan coefficient value associated with the data storage plan; and
calculate the storage requirement based on the plan coefficient value.

13. The system of claim 1, further comprising:
a data lookup data structure generator configured to:
receive, over a network, aggregated data associated with storage requirements for other systems located in a same region as the video image sensor;
determine at least one recording coefficient value based on the aggregated data; and
store the at least one recording coefficient value in a coefficient lookup data structure.

14. A computer-implemented method, comprising:
determining a baseline data storage value based on a data storage plan for a video camera at a camera location;
receiving scene video data depicting a view at the camera location;
determining, based on the scene video data, a scene description comprising at least one scene descriptor;
determining a category of scene activity of the view based on the scene description;
determining a recording coefficient value based on the determined category of scene activity of the view;
calculating a storage requirement based on:
the baseline data storage value; and
the recording coefficient value; and
presenting the calculated storage requirement on a user interface of a user device.

15. The computer-implemented method of claim 14, further comprising:
determining, for the video camera, a data retention policy based on a selected time period; and
receiving product information about the video camera, wherein the baseline data storage value is further based on the data retention policy and the product information.

16. The computer-implemented method of claim 14, further comprising:
determining, using an object detection model, verification object data for detected objects in the scene video data;
comparing the verification object data for the detected objects to reference scene data retrieved from a reference data source;
determining a metric of activity based on the comparison and the camera location; and
determining the category of scene activity responsive to the metric of activity exceeding a predetermined threshold.

17. The computer-implemented method of claim 14, further comprising:
determining an updated baseline data storage value based on at least one of:
a received number of days to store video data;
a received number of hours per day to store video data; and
a received number of cameras; and
determining the storage requirement based the updated baseline data storage value.

18. The computer-implemented method of claim 14, further comprising:
retrieving a set of product information values based on at least one of:
a user-inputted model number; and
a received web link;
determining an updated baseline data storage value based on at least one product information value from the set of product information values; and calculating the storage requirement based on the updated baseline data storage value.

19. The computer-implemented method of claim 14, further comprising:

determining a plan coefficient value associated with a data storage plan; and calculating the storage requirement based on the plan coefficient value.

20. A system, comprising:

a processor;

a memory;

means for determining a baseline data storage value based on a data storage plan for a video camera at a camera location;

means for receiving scene video data depicting a view at the camera location;

means for determining, based on the scene video data, a scene description comprising at least one scene descriptor;

means for determining a category of scene activity of the view based on the scene description;

means for determining a recording coefficient value based on the determined category of scene activity of the view;

means for calculating a storage requirement based on:
the baseline data storage value; and
the recording coefficient value; and means for presenting the calculated storage requirement on a user interface of a user device.

* * * * *